US008665341B2

(12) United States Patent
Georgiev et al.

(10) Patent No.: US 8,665,341 B2
(45) Date of Patent: Mar. 4, 2014

(54) METHODS AND APPARATUS FOR RENDERING OUTPUT IMAGES WITH SIMULATED ARTISTIC EFFECTS FROM FOCUSED PLENOPTIC CAMERA DATA

(75) Inventors: Todor G. Georgiev, Sunnyvale, CA (US); Georgi N. Chunev, Bloomington, IN (US)

(73) Assignee: Adobe Systems Incorporated, San Jose, CA (US)

( * ) Notice: Subject to any disclaimer, the term of this patent is extended or adjusted under 35 U.S.C. 154(b) by 227 days.

(21) Appl. No.: 12/957,320

(22) Filed: Nov. 30, 2010

(65) Prior Publication Data

US 2013/0128069 A1 May 23, 2013

Related U.S. Application Data

(60) Provisional application No. 61/377,896, filed on Aug. 27, 2010.

(51) Int. Cl.
*H04N 5/228* (2006.01)
*G02B 13/16* (2006.01)
*H04N 5/225* (2006.01)

(52) U.S. Cl.
USPC .................. 348/222.1; 348/335; 348/340

(58) Field of Classification Search
USPC .................. 348/222.1, 335; 250/208.1
See application file for complete search history.

(56) References Cited

U.S. PATENT DOCUMENTS

| 725,567 | A | 4/1903 | Ives |
| 2,039,648 | A | 5/1936 | Ives |
| 3,743,379 | A | 7/1973 | McMahon |
| 3,971,065 | A | 7/1976 | Bayer |
| 3,985,419 | A | 10/1976 | Matsumoto et al. |
| 4,175,844 | A | 11/1979 | Glaser-Inbari |
| 4,180,313 | A | 12/1979 | Inuiya |
| 4,193,093 | A | 3/1980 | St. Clair |

(Continued)

FOREIGN PATENT DOCUMENTS

| CN | 101588437 | 11/2009 |
| CN | 101610353 | 12/2009 |

(Continued)

OTHER PUBLICATIONS

"Final Office Action", U.S. Appl. No. 12/957,312, (Jun. 6, 2013), 16 pages.

(Continued)

*Primary Examiner* — Timothy J Henn
*Assistant Examiner* — Pritham Prabhakher
(74) *Attorney, Agent, or Firm* — Wolfe-SBMC

(57) ABSTRACT

Methods, apparatus, and computer-readable storage media for simulating artistic effects in images rendered from plenoptic data. An impressionistic-style artistic effect may be generated in output images of a rendering process by an "impressionist" 4D filter applied to the microimages in a flat captured with focused plenoptic camera technology. Individual pixels are randomly selected from blocks of pixels in the microimages, and only the randomly selected pixels are used to render an output image. The randomly selected pixels are rendered to generate the artistic effect, such as an "impressionistic" effect, in the output image. A rendering technique is applied that samples pixel values from microimages using a thin sampling kernel, for example a thin Gaussian kernel, so that pixel values are sampled only from one or a few of the microimages.

17 Claims, 23 Drawing Sheets

(56) References Cited

U.S. PATENT DOCUMENTS

| | | | |
|---|---|---|---|
| 4,230,942 A | 10/1980 | Stauffer |
| 4,580,219 A | 4/1986 | Pelc et al. |
| 4,732,453 A | 3/1988 | de Montebello et al. |
| 4,849,782 A | 7/1989 | Koyama et al. |
| 5,076,687 A | 12/1991 | Adelson |
| 5,125,750 A | 6/1992 | Corel et al. |
| 5,361,127 A | 11/1994 | Daily |
| 5,400,093 A | 3/1995 | Timmers |
| 5,579,445 A | 11/1996 | Loce et al. |
| 5,659,420 A | 8/1997 | Wakai et al. |
| 5,724,122 A | 3/1998 | Oskotsky |
| 5,729,011 A | 3/1998 | Sekiguchi |
| 5,946,077 A | 8/1999 | Nemirovskiy |
| 5,987,164 A | 11/1999 | Szeliski et al. |
| 6,009,188 A | 12/1999 | Cohen et al. |
| 6,097,394 A | 8/2000 | Levoy et al. |
| 6,097,541 A | 8/2000 | Davies et al. |
| 6,137,535 A | 10/2000 | Meyers |
| 6,137,937 A | 10/2000 | Okano et al. |
| 6,268,846 B1 | 7/2001 | Georgiev |
| 6,301,416 B1 | 10/2001 | Okano et al. |
| 6,317,192 B1 | 11/2001 | Silverbrook et al. |
| 6,339,506 B1 | 1/2002 | Wakelin et al. |
| 6,341,183 B1 | 1/2002 | Goldberg |
| 6,351,269 B1 | 2/2002 | Georgiev |
| 6,476,805 B1 | 11/2002 | Shum et al. |
| 6,570,613 B1 | 5/2003 | Howell |
| 6,738,533 B1 | 5/2004 | Shum et al. |
| 6,804,062 B2 | 10/2004 | Atwater et al. |
| 6,831,782 B2 | 12/2004 | Patton et al. |
| 6,838,650 B1 | 1/2005 | Toh |
| 6,842,297 B2 | 1/2005 | Dowski, Jr. |
| 6,961,075 B2 | 11/2005 | Mindler et al. |
| 7,019,671 B2 | 3/2006 | Kawai |
| 7,054,067 B2 | 5/2006 | Okano et al. |
| 7,085,062 B2 | 8/2006 | Hauschild |
| 7,113,231 B2 | 9/2006 | Conner et al. |
| 7,119,319 B2 | 10/2006 | Noto et al. |
| 7,164,446 B2 | 1/2007 | Konishi |
| 7,167,203 B1 | 1/2007 | Yukawa et al. |
| 7,367,537 B2 | 5/2008 | Ibe |
| 7,470,032 B2 | 12/2008 | Damera-Venkata et al. |
| 7,620,309 B2 | 11/2009 | Georgiev |
| 7,723,662 B2 | 5/2010 | Levoy et al. |
| 7,732,744 B2 | 6/2010 | Utagawa |
| 7,792,423 B2 | 9/2010 | Raskar et al. |
| 7,838,814 B2 | 11/2010 | Minhas et al. |
| 7,872,796 B2 | 1/2011 | Georgiev |
| 7,880,794 B2 * | 2/2011 | Yamagata et al. ............ 348/335 |
| 7,916,934 B2 | 3/2011 | Vetro et al. |
| 7,936,392 B2 | 5/2011 | Ng et al. |
| 7,949,252 B1 | 5/2011 | Georgiev |
| 7,956,924 B2 | 6/2011 | Georgiev |
| 7,962,033 B2 | 6/2011 | Georgiev et al. |
| 7,965,936 B2 | 6/2011 | Raskar et al. |
| 7,978,234 B2 | 7/2011 | Yano et al. |
| 8,019,215 B2 | 9/2011 | Georgiev et al. |
| 8,106,994 B2 | 1/2012 | Ichimura |
| 8,126,323 B2 | 2/2012 | Georgiev et al. |
| 8,155,456 B2 | 4/2012 | Babacan et al. |
| 8,160,439 B2 | 4/2012 | Georgiev et al. |
| 8,189,065 B2 | 5/2012 | Georgiev et al. |
| 8,189,089 B1 | 5/2012 | Georgiev |
| 8,228,417 B1 | 7/2012 | Georgiev et al. |
| 8,237,843 B2 | 8/2012 | Yamamoto et al. |
| 8,243,157 B2 | 8/2012 | Ng et al. |
| 8,289,440 B2 | 10/2012 | Knight et al. |
| 8,290,358 B1 | 10/2012 | Georgiev |
| 8,315,476 B1 | 11/2012 | Georgiev et al. |
| 8,330,848 B2 | 12/2012 | Yamamoto |
| 8,345,144 B1 | 1/2013 | Georgiev et al. |
| 8,379,105 B2 | 2/2013 | Georgiev et al. |
| 8,380,060 B2 | 2/2013 | Georgiev et al. |
| 8,390,728 B2 | 3/2013 | Lim et al. |
| 8,400,555 B1 | 3/2013 | Georgiev et al. |
| 8,401,316 B2 | 3/2013 | Babacan |
| 8,471,920 B2 | 6/2013 | Georgiev et al. |
| 8,502,911 B2 | 8/2013 | Yamamoto et al. |
| 8,559,756 B2 | 10/2013 | Georgiev et al. |
| 8,611,693 B2 | 12/2013 | Intwala et al. |
| 2001/0012149 A1 | 8/2001 | Lin et al. |
| 2001/0050813 A1 | 12/2001 | Allio |
| 2002/0140835 A1 | 10/2002 | Silverstein |
| 2002/0159030 A1 | 10/2002 | Frey et al. |
| 2003/0108821 A1 | 6/2003 | Mei et al. |
| 2003/0117511 A1 | 6/2003 | Belz et al. |
| 2003/0156077 A1 | 8/2003 | Balogh |
| 2003/0231255 A1 | 12/2003 | Szajewski et al. |
| 2004/0114807 A1 | 6/2004 | Lelescu et al. |
| 2004/0218830 A1 | 11/2004 | Kang et al. |
| 2004/0223214 A1 | 11/2004 | Atkinson |
| 2005/0080602 A1 | 4/2005 | Snyder et al. |
| 2005/0088714 A1 | 4/2005 | Kremen |
| 2005/0099504 A1 | 5/2005 | Nayar et al. |
| 2005/0122418 A1 | 6/2005 | Okita et al. |
| 2005/0243178 A1 | 11/2005 | McConica |
| 2006/0061845 A1 | 3/2006 | Lin |
| 2006/0072029 A1 | 4/2006 | Miyatake et al. |
| 2006/0104542 A1 | 5/2006 | Blake et al. |
| 2006/0109282 A1 | 5/2006 | Lin et al. |
| 2006/0177150 A1 | 8/2006 | Uyttendaele et al. |
| 2007/0091197 A1 | 4/2007 | Okayama et al. |
| 2007/0252074 A1 * | 11/2007 | Ng et al. ............... 250/208.1 |
| 2007/0258096 A1 | 11/2007 | Cui et al. |
| 2007/0285526 A1 | 12/2007 | Mann et al. |
| 2008/0007839 A1 | 1/2008 | Deng et al. |
| 2008/0056549 A1 | 3/2008 | Hamill et al. |
| 2008/0095469 A1 | 4/2008 | Kiser |
| 2008/0107231 A1 | 5/2008 | Miyazaki et al. |
| 2008/0142685 A1 | 6/2008 | Gazeley |
| 2008/0152215 A1 | 6/2008 | Horie et al. |
| 2008/0165270 A1 | 7/2008 | Watanabe et al. |
| 2008/0166063 A1 | 7/2008 | Zeng |
| 2008/0187305 A1 | 8/2008 | Raskar |
| 2008/0193026 A1 | 8/2008 | Horie et al. |
| 2008/0218610 A1 | 9/2008 | Chapman et al. |
| 2008/0247623 A1 | 10/2008 | Delso et al. |
| 2009/0002504 A1 | 1/2009 | Yano et al. |
| 2009/0027542 A1 | 1/2009 | Yamamoto et al. |
| 2009/0041381 A1 | 2/2009 | Georgiev |
| 2009/0041448 A1 | 2/2009 | Georgiev |
| 2009/0086304 A1 | 4/2009 | Yurlov et al. |
| 2009/0122175 A1 * | 5/2009 | Yamagata ............... 348/335 |
| 2009/0127440 A1 | 5/2009 | Nakai |
| 2009/0128658 A1 | 5/2009 | Hayasaka et al. |
| 2009/0128669 A1 * | 5/2009 | Ng et al. ............... 348/241 |
| 2009/0140131 A1 | 6/2009 | Utagawa |
| 2009/0167922 A1 | 7/2009 | Perlman et al. |
| 2009/0179142 A1 | 7/2009 | Duparre et al. |
| 2009/0185801 A1 | 7/2009 | Georgiev et al. |
| 2009/0190022 A1 * | 7/2009 | Ichimura ............... 348/340 |
| 2009/0268970 A1 | 10/2009 | Babacan et al. |
| 2009/0295829 A1 | 12/2009 | Georgiev et al. |
| 2009/0316014 A1 | 12/2009 | Lim et al. |
| 2010/0013979 A1 | 1/2010 | Golub et al. |
| 2010/0026852 A1 | 2/2010 | Ng et al. |
| 2010/0085468 A1 | 4/2010 | Park et al. |
| 2010/0091133 A1 | 4/2010 | Lim et al. |
| 2010/0097491 A1 | 4/2010 | Farina et al. |
| 2010/0128145 A1 | 5/2010 | Pitts et al. |
| 2010/0141802 A1 | 6/2010 | Knight et al. |
| 2010/0205388 A1 | 8/2010 | MacInnis |
| 2010/0265381 A1 | 10/2010 | Yamamoto et al. |
| 2010/0265386 A1 | 10/2010 | Raskar et al. |
| 2011/0043604 A1 | 2/2011 | Peleg et al. |
| 2011/0063354 A1 | 3/2011 | Enge |
| 2011/0069189 A1 | 3/2011 | Venkataraman et al. |
| 2011/0141224 A1 | 6/2011 | Stec et al. |
| 2011/0169980 A1 | 7/2011 | Cho et al. |
| 2011/0211824 A1 | 9/2011 | Georgiev et al. |
| 2012/0183232 A1 | 7/2012 | Babacan et al. |
| 2012/0229679 A1 | 9/2012 | Georgiev et al. |
| 2012/0281072 A1 | 11/2012 | Georgiev et al. |
| 2013/0120356 A1 | 5/2013 | Georgiev |

(56) References Cited

U.S. PATENT DOCUMENTS

| | | | |
|---|---|---|---|
| 2013/0120605 | A1 | 5/2013 | Georgiev |
| 2013/0121615 | A1 | 5/2013 | Intwala |
| 2013/0127901 | A1 | 5/2013 | Georgiev et al. |
| 2013/0128030 | A1 | 5/2013 | Georgiev |
| 2013/0128068 | A1 | 5/2013 | Georgiev et al. |
| 2013/0128077 | A1 | 5/2013 | Georgiev |
| 2013/0128081 | A1 | 5/2013 | Georgiev |
| 2013/0128087 | A1 | 5/2013 | Georgiev et al. |

FOREIGN PATENT DOCUMENTS

| | | |
|---|---|---|
| CN | 807604 | 7/2011 |
| EP | 1548481 | 6/2005 |
| JP | 7270791 | 10/1995 |
| JP | 2001330769 | 11/2001 |
| JP | 2004239932 | 8/2004 |
| WO | 01/37025 | 5/2001 |
| WO | 2006/057838 | 6/2006 |
| WO | WO-2007044725 | 4/2007 |
| WO | 2007/115281 | 10/2007 |
| WO | WO-2009151903 | 12/2009 |

OTHER PUBLICATIONS

"Final Office Action", U.S. Appl. No. 12/957,322, (Aug. 12, 2013),16 pages.

"Non-Final Office Action", U.S. Appl. No. 12/957,308, (Jul. 25, 2013),18 pages.

"Notice of Allowance", U.S. Appl. No. 13/434,189, (Jul. 10, 2013), 8 pages.

"Supplemental Notice of Allowance", U.S. Appl. No. 12/186,392, (Jul. 19, 2013), 5 pages.

Adelson, T., et al. "Single Lens Stereo with a Plenoptic Camera," IEEE Transactions on Pattern Analysis and Machine, Intelligence 14, 2, Feb. 1992, pp. 99-106.

Ng, R., et al, "Light Field Photography with a Hand-Held Plenoptic Camera," Stanford Univ. Computer Science Tech, Report CSTR Feb. 2005, Apr. 2005, pp. 1-11.

Ng R.: "Fourier Slice Photography," Proceedings of ACM SIGGRAPH 2005 (Jan. 2005), pp. 1-10.

Lin Z., Shum H.: Fundamental limits of reconstruction-based super-resolution algorithms under local translation. IEEE Transactions on Pattern Analysis and Machine Intelligence 26, (Jan. 1, 2004), pp. 83-97.

Levoy, Mark et al., "Light Field Microscopy," Stanford University, Submitted to Siggraph 2006, pp. 1-5.

Levoy, Mark, "Optical Recipes for Light Microscopes," Stanford Computer Grpahics Laboratory Technical Memo 2006-001, Jun. 20, 2006, pp. 1-10.

Levoy M., Hanrahan P.: "Light Field Rendering," ACM Trans. Graph. (1996), pp. 31-42.

M. Levoy, "Light Fields and computational Imaging," Computer [Online], vol. 39, No. 8, Aug. 2006, pp. 46-55, XP002501300.

Georgeiv, et al. "Spatio-Angular Resolution Tradeoff in Integral Photography," Proc. EGSR, 2006, pp. 1-10.

Georgiev T., Wainer M.: "Morphing Between Multiple Images," Tech. Rep. Apr. 17, 1997, pp. 1-17.

Georgiev T., Lumsdaine A.: Depth of field in plenoptic cameras. In Eurographics 2009—Annex (Apr. 2009), pp. 5-8.

Brown M., Lowe D. G.: "Unsupervised 3d Object Recognition and Reconstruction in Unordered Datasets," In Proceedings of 5th International Conference on 3D Imaging and Modelling (3DIM) (2005), pp. 21-30.

Gortler S. J., Grzeszczuk R., Szeliski, R., Cohen M. F.: "The Lumigraph," ACM Trans. Graph. (1996), pp. 43-54.

Isaksen A., McMillan L., Gortler S. J.: "Dynamically Reparameterized Light Fields," ACM Trans. Graph. (2000), pp. 297-306.

Lee S., Wolberg G., Shin S.: "Polymorph: Morphing Among Multiple Images," IEEE Computer Graphics and Applications (Jan./Feb. 1998), pp. 1-14.

Lippmann G.: "Epreuves reversible donnant la sensation du relief ("Reversible Prints Providing the Sensation of Depth")", Journal of Physics 7 (1908), pp. 821-825.

Lippmann G.: "Epreuves Reversibles Photographies Integrales," Academie des sciences (Mar. 1908), pp. 446-451.

Naemura T., Yoshida T., Harashima H.: "3d Computer Graphics Based on Integral Photography," Optics Express, vol. 8, 2 (Feb. 6, 2001), pp. 1-8.

Seitz S. M., Dyer C. R.: "View Morphing," ACM Trans. Graph. (1996), pp. 21-30.

Stevens R., Harvey T.: "Lens Arrays for a Three-dimensional Imaging System," Journal of Optics A, vol. 4 (2002), pp. 1-5.

Stewart J., Yu J., Gortler S. J., McMillan L.: "A New Reconstruction Filter for Undersampled Light Field," Eurographics Symposium on Rendering (2003), pp. 150-156.

Vaish V., Wilburn B., Joshi N., Levoy M.: "Using Plane + Parallax to Calibrate Dense Camera Arrays," In Proceedings of IEEE Conference on Computer Vision and Pattern Recognition (CVPR) (2004), pp. 1-8.

Wilburn B., Joshi N., Vaish V., Talvala E., Antunez E., Barth A., Adams A., Levoy M., Horowitz M.: "High Performance Imaging Using Large Camera Arrays," In ACM Trans. Graph. (2005), pp. 1-12.

Xiao J., Shah M.: "Tri-view Morphing," Computer Vision and Image Understanding 96, 3 (2004), pp. 345-366.

Zitnick C. L., Jojic N., Kang S.: "Consistent Segmentation for Optical Flow Estimation" In Proceedings of IEEE International Conference on Computer Vision (ICCV) (2005), pp. 1-8.

Veeraraghavan, et al., "Dappled Photography: Mask Enhanced Cameras for Heterodyned Light Fields and Coded Aperture Refocusing," ACM Transaction on Graphics, vol. 26, No. 3, Article 69, Jul. 2007, pp. 1-12, XP002491494.

J. Chai, S. Chan, H. Shum, and X. Tong: "Plenoptic Sampling", ACM Trans. Graph., pp. 307-318, 2000.

F. Durand, N. Holzschuch, C. Soler, E. Chan, and F. Sillion: "A frequency Analysis of Light Transport," ACM Trans. Graph., pp. 1115-1126, 2005.

Todor Georgiev and Chintan Intwala: "Light Field Camera Design for Integral View Photography," Adobe Tech. Rep., 2006, pp. 1-13.

J- Neumann, et al., "Eyes from Eyes Analysis of Camera Design Using Plenoptic Video Geometry," Dec. 2001, pp. 1-20, XP002509893.

Zaharia, R., et al., "Adaptive 3D-DCT Compression Algorithm for Continuous Parallax 3D Integral Imaging," Signal Processing, Image Communication, Elsevier Scient Publishers, Amsterdam, NL, vol. 17, No. 3, Mar. 1, 2002, pp. 1-2.

Yang, J C, et al., "A Real-Time Distributed Light Field Camera," Rendering Techniques 2002, Eurographics Workshop Proceedings, PIS, Italy, Jun. 26-28, 2002, pp. 1-9.

Zhang, et al., "A Survey on Image-based Rendering-Representation, Sampling and Compression," Signal Processing, Image Communication, Elsevier Science Publishers, vol. 19, No. 1, Jan. 1, 2004, pp. 1-28.

Heung-Yeung Shum, et al., "Survey of Image-Based Representations and Compression Techniques," IEEE Transactions on Circuits and Systems for Video Technology, IEEE Service Center, vol. 13, No. 11, Nov. 1, 2003 pp. 1-18.

Shing-Chow, Chan, et al., "The Compression of Simplified Dynamic Light Fields," Proceedings of International Conference on Acoustics, Speech and Signal Processing, Apr. 6-10, 2003 Hong Kong, vol. 3, Apr. 6, 2003, pp. 1-4.

Ulrich, Fecker, et al., "Transposed Picture Ordering for Dynamic Light Field Coding," Joint Video Team (JVT) of ISO/IEC MPEG & ITU-T VGEG (ISO/IEC JTC1/SC29/WG11 and ITU-T SG16 Q6), Jul. 9, 2004, pp. 1-8.

Grzeszczuk, R., et al., "Standard Support for 1-13 Progressive Encoding, Compression and Interactive Visualization of Surface Light Fields," Joint Video Tem (JVT) of ISO/IEC MPEG & ITU-T VGEG (ISO/IEC JTC1/SC29/WG11 and ITU-TSG16 Q6), Nov. 21, 2001, pp. 1-11.

Chang, et al., "Light Field Compression Using Disparity-Compensated Lifting and Shape Adaptation," IEEE Transactions on Image Processing, vol. 15, No. 4, Apr. 2006, pp. 793-806.

(56) References Cited

OTHER PUBLICATIONS

Sebe, et al., "Mutli-View Geometry Estimation for Light Field Compression," VMV 2002, pp. 1-8.
Borman, S., and Stevenson, R., "Super-resolution from image sequences—a review", Proceedings of the 1998 Midwest Symposium on Circuits and Systems, Publication Date: Aug. 9-12, 1998, on pp. 374-378.
Elad, M., and Feuer, A., "Restoration of a single superresolution image from several blurred, noisy, and undersampled measured images," IEEE Transactions on Image Processing Dec. 1997, pp. 1646-1658.
Farsiu, S., Robinson, D., Elad, M., and Milanfar, P., "Advances and challenges in super-resolution," International Journal of Imaging Systems and Technology, 2004, pp. 1-12.
Park, S., Park, M., and Kang, M., "Super-resolution image reconstruction: a technical overview," Signal Processing Magazine, 2003, pp. 1-16.
David E. Roberts, History of Lenticular and Related Autostereoscopic Methods, 2003, pp. 1-17.
Fife K., Gamal A. E., Wong H.-S. P.: A 3mpixel multi-aperture image sensor with 0.7um pixels in 0.11um cmos. In IEEE ISSCC Digest of Technical Papers (Feb. 2008), pp. 48-49.
Lumsdaine A., Georgiev T.: Full Resolution Lightfield Rendering. Tech. rep., Adobe Systems, Jan. 2008, pp. 1-12.
Baker S., Kanade T.: Limits on superresolution and how to break them. IEEE Transactions on Pattern Analysis and Machine Intelligence (Jan. 2002), pp. 1-377.
Bishop T. E., Zanetti S., Favaro P.: Light field superresolution. In International Conference on Computational Photography (Apr. 16-17, 2009), pp. 1-4.
Levin A., Fergus R., Durand F., Freeman W.: Image and depth from a conventional camera with a coded aperture. ACM Transactions on Graphics, SIGGRAPH 2007 Conference Proceedings, San Diego, CA (2007), pp. 1-10.
Ng, "Digital Light Field Photography," Jul. 2006, A Dissertation Submitted to the Dept. of Computer Science and the Committee on Graduate Studies of Stanford Univ in Partial fulfillment of the requirements for the degree of Doctor of Philosophy, pp. 1-203.
JP504669 (1975), all pages, english equivalent is U.S. Patent 3985419, dated Oct. 12, 1976 by Matsumoto, et al.
Lumsdaine A., Georgiev T.: The focused plenoptic camera. In International Conference on Computational Photography (Apr. 2009), 8 pages.
Ng M. K., Bose N. K.: Mathematical analysis of super-resolution methodology. Signal Processing Magazine, IEEE 20, 3 (2003), pp. 62-74.
Schultz R.: Super-resolution enhancement of native digital video versus digitized NTSC sequences. In Proceedings of the Fifth IEEE Southwest Symposium on Image Analysis and Interpretation (2002), pp. 193-197.
Dana Dudley, Walter Duncan, John Slaughter, "Emerging Digital Micromirror Device (DMD) Applications", DLPTM Products New Applications, Texas Instruments, Inc., Copyright 2003 Society of Photo-Optical Instrumentation Engineers., This paper was published in SPIE Proceedings vol. 4985, 12 pages.Levoy, et al. "Recording and controlling the 4D light field in a microscope using microlens arrays", Journal of Microscopy, 2009, pp. 1-19.
Shree K. Nayar, Vlad Branzoi, Terry E. Boult, "Programmable Imaging using a Digital Micromirror Array", Shree K. Nayar, Vlad Branzoi, Terry E. Boult, In Conf. on Computer Vision and Pattern Recognition, pp. 436-443, 2004.
U.S. Appl. No. 12/574,183, filed Oct. 6, 2009, Adobe Systems Incorporated.
U.S. Appl. No. 12/957,326, filed Nov. 30, 2010, Adobe Systems Incorporated.
U.S. Appl. No. 12/917,984, filed Nov. 2, 2010, Adobe Systems Incorporated.
U.S. Appl. No. 12/957,308, filed Nov. 30, 2010, Adobe Systems Incorporated.
U.S. Appl. No. 11/874,611, filed Oct. 18, 2007, Adobe Systems Incorporated.
U.S. Appl. No. 12/111,735, filed Apr. 29, 2008, Adobe Systems Incorporated.
U.S. Appl. No. 12/790,677, filed May 28, 2010, Adobe Systems Incorporated.
U.S. Appl. No. 12/474,112, filed May 28, 2009, Adobe Systems Incorporated.
U.S. Appl. No. 12/130,725, filed May 30, 2008, Adobe Systems Incorporated.
U.S. Appl. No. 12/628,437, filed Dec. 1, 2009, Adobe Systems Incorporated.
U.S. Appl. No. 12/690,869, filed Jan. 20, 2010, Adobe Systems Incorporated.
U.S. Appl. No. 12/690,871, filed Jan. 20, 2010, Adobe Systems Incorporated.
U.S. Appl. No. 12/503,803, filed Jul. 15, 2009, Adobe Systems Incorporated.
S Todt, C Rezk-Salama, A Kolb, and K.-D Kuhnert, "Fast (Spherical) Light Field Rendering with Per-Pixel Depth," Technical Report, Computer Graphics Group, University of Siegen, 2007, pp. 1-8.
John Kessenich, Dave Baldwin, Randi Rost. The OpenGL Shading Language, Version: 4.00, Document Revision: 7, Feb. 12, 2010, pp. 1-160.
Mark Segal, Kurt Akeley. The OpenGL Graphics System: A Specification (Version 3.2 (Core Profile)—Dec. 7, 2009), pp. 1-104.
"PyOpenGL, The Python OpenGL® Binding" downloaded from http://pyopengl.sourceforge.net/ on Dec. 21, 2010, pp. 1-2.
T. Adelson and J. Bergen, "The plenoptic function and the elements of early vision," in Computational models of visual processing (MIT Press, 1991), pp. 1-18.
Tanida, J. Yamada, K., "TOMBO: thin observation module by bound optics," Lasers and Electro-Optics Society, 2002. LEOS 2002. The 15th Annual Meeting of the IEEE, Issue Date: 2002, pp. 233-234 vol. 1.
M Christensen, M Haney, D Rajan, S Douglas, and S Wood, "Panoptes: A thin agile multi-resolution imaging sensor," Government Microcuircuit Applications and Critical, Technology Conference (GOMACTech-05)(Jan. 2005), pp. 1-4.
D Capel and A Zisserman, "Computer vision applied to super resolution," Signal Processing Magazine(Jan. 2003), pp. 1-10.
P Sloan, M Cohen, and S Gortler, "Time critical lumigraph rendering," Proceedings of the 1997 symposium on Interactive 3D graphics (Jan. 1997), pp. 1-7.
John Nickolls, Ian Buck, Michael Garland, and Kevin Skadron, "Scalable parallel programming with cuda," Queue 6, 40-53 (2008), pp. 1-40.
John E. Stone, David Gohara, and Guochun Shi, "OpenCL—The open standard for parallel programming of heterogeneous systems." Comput. in Sci. and Eng., 12:66-73, 2010, pp. 1-66.
Georgiev, et al. "Light-Field Capture by Multiplexing in the Frequency Domain," ADOBE Technical Report, Apr. 2007, pp. 1-14.
"Optical virtual imaging at 50 nm lateral resolution with a white-light nanoscope," Zengbo Wang, Wei Guo, Lin Li, Boris Luk'yanchuk , Ashfaq Khan, Zhu Liu, Zaichun Chen, Minghui Hong, Nature Communications, Published Mar. 1, 2011, pp. 1-13.
"The optical microscopy with virtual image breaks a record: 50-nm resolution imaging is demonstrated," Zengbo Wang, Wei Guo, Lin Li, Zhu Liu, Boris Luk'yanchuk, Zaichun Chen, Minghui Hong, Jun. 2010, Cornell University Library, http://arxiv.org/abs/1006.4037v1, pp. 1-7.
"Direct imaging of photonic nanojets," Patrick Ferrand, JeromeWenger, Alexis Devilez, Martina Pianta, Brian Stout, Nicolas Bonod, Evgueni Popov, Herve Rigneault, Opt. Express 16, pp. 6930-6940 (2008).
Qiang Wu, G. D. Feke, Robert D. Grober, L. P. Ghislain, "Realization of numerical aperture 2.0 using a gallium phosphide solid immersion lens," Applied Physics Letters 75 (1999): pp. 4064-4066.
"Imaging with solid immersion lenses, spatial resolution, and applications", Q. Wu, L. P. Ghislain, and V. B. Elings, Proc. IEEE 88, 1491 (2000), pp. 1-8.
U.S. Appl. No. 13/288,765, filed Nov. 3, 2011, Georgiev.
U.S. Appl. No. 13/429,226, filed Mar. 23, 2012, Babacan, et al.

(56) References Cited

OTHER PUBLICATIONS

U.S. Appl. No. 13/288,759, filed Nov. 3, 2011, Georgiev.
U.S. Appl. No. 12/957,312, filed Nov. 30, 2010, Georgiev.
U.S. Appl. No. 12/957,316, filed Nov. 30, 2010, Georgiev.
U.S. Appl. No. 12/957,322, filed Nov. 30, 2010, Georgiev.
"Non-Final Office Action", U.S. Appl. No. 12/957,316, (Mar. 22, 2013),16 pages.
"Non-Final Office Action", U.S. Appl. No. 12/690,869, (Mar. 26, 2012), 8 pages.
"Non-Final Office Action", U.S. Appl. No. 12/957,322, (Apr. 24, 2013),15 pages.
"Notice of Allowance", U.S. Appl. No. 12/690,869, (Jul. 13, 2012), 7 pages.
Aliaga, et al., "Plenoptic Stitching: A Scalable Method for Reconstructing 30 Interactive Walkthroughs", *Proceedings of the 28th annual conference on Computer graphics and interactive techniques*, (Aug. 2001), pp. 443-450.
Hunt, B. R., "Super-Resolution of Images: Algorithms, Principles, Performance", *International Journal of Imaging Systems and Technology*, vol. 6, (Jan. 1995), 9 pages.
Meng, et al., "An Approach on Hardware Design for Computational Photography Applications based on Light Field Refocusing Algorithm", *Technical Reports CS-2007-15, University of Virginia*, (Nov. 18, 2007), pp. 1-12.
"European Search Report", EP Application No. 09159086.9, (Aug. 14, 2009), 8 pages.
"Final Office Action", U.S. Appl. No. 13/425,306, (Sep. 19, 2012), 7 pages.
"Final Office Action", U.S. Appl. No. 12/130,725, (Jan. 3, 2012), 6 pages.
"Non-Final Office Action", U.S. Appl. No. 12/130,725, (Sep. 9, 2011), 7 pages.
"Non-Final Office Action", U.S. Appl. No. 12/186,392, (Apr. 3, 2012), 13 pages.
"Non-Final Office Action", U.S. Appl. No. 12/186,392, (Nov. 19, 2012), 13 pages.
"Non-Final Office Action", U.S. Appl. No. 12/271,389, (Sep. 30, 2010), 7 pages.
"Non-Final Office Action", U.S. Appl. No. 12/474,112, (Oct. 19, 2011), 5 pages.
"Non-Final Office Action", U.S. Appl. No. 12/957,312, (Nov. 13, 2012), 14 pages.
"Non-Final Office Action", U.S. Appl. No. 13/103,880, (Aug. 9, 2011), 5 pages.
"Non-Final Office Action", U.S. Appl. No. 13/425,306, (May 31, 2012), 7 pages.
"Non-Final Office Action", U.S. Appl. No. 13/434,189, (Mar. 7, 2013), 8 pages.
"Non-Final Office Action", U.S. Appl. No. 13/476,638, (Jul. 6, 2012), 6 pages.
"Notice of Allowance", U.S. Appl. No. 12/917,984, (Aug. 21, 2012), 11 pages.
"Notice of Allowance", U.S. Appl. No. 12/130,725, (Apr. 3, 2012), 8 pages.
"Notice of Allowance", U.S. Appl. No. 12/186,392, (Mar. 13, 2013), 8 pages.
"Notice of Allowance", U.S. Appl. No. 12/271,389, (Feb. 2, 2011), 4 pages.
"Notice of Allowance", U.S. Appl. No. 12/271,389, (Jun. 18, 2010), 6 pages.
"Notice of Allowance", U.S. Appl. No. 12/474,112, (Jan. 30, 2012), 5 pages.
"Notice of Allowance", U.S. Appl. No. 12/503,803, (Mar. 20, 2012), 6 pages.
"Notice of Allowance", U.S. Appl. No. 12/628,437, (Dec. 18, 2012), 6 pages.
"Notice of Allowance", U.S. Appl. No. 13/103,880, (Dec. 13, 2011), 5 pages.
"Notice of Allowance", U.S. Appl. No. 13/425,306, (Dec. 10, 2012), 4 pages.
"Notice of Allowance", U.S. Appl. No. 13/429,226, (Dec. 26, 2012), 7 pages.
"Notice of Allowance", U.S. Appl. No. 13/476,638, (Oct. 29, 2012), 4 pages.
"Notice of Allowance", U.S. Appl. No. 13/549,330, (Feb. 7, 2013), 9 pages.
"Restriction Requirement", U.S. Appl. No. 12/130,725, (Jul. 15, 2011), 5 pages.
"Restriction Requirement", U.S. Appl. No. 12/474,112, (Jul. 28, 2011), 6 pages.
"Restriction Requirement", U.S. Appl. No. 12/957,316, (Jan. 23, 2013), 6 pages.
"Supplemental Notice of Allowance", U.S. Appl. No. 12/271,389, (Feb. 10, 2011), 2 pages.
"Supplemental Notice of Allowance", U.S. Appl. No. 12/474,112, (Mar. 8, 2012), 2 pages.
"Supplemental Notice of Allowance", U.S. Appl. No. 12/503,803, (Apr. 23, 2012), 13 pages.
"Supplemental Notice of Allowance", U.S. Appl. No. 13/103,880, (Jan. 20, 2012), 2 pages.
"U.S. Application as Filed", U.S. Appl. No. 11/627,141, (Jan. 25, 2007), 43 pages.
"U.S. Application as Filed", U.S. Appl. No. 12/186,396, (Aug. 5, 2008), 69 pages.
"U.S. Application as Filed", U.S. Appl. No. 12/271,389, (Nov. 14, 2008), 63 pages.
"U.S. Application as Filed", U.S. Appl. No. 12/636,168, (Dec. 11, 2009), 60 pages.
"U.S. Application as Filed", U.S. Appl. No. 12/690,569, (Jan. 20, 2010), 36 pages.
"U.S. Application as Filed", U.S. Appl. No. 12/957,320, (Nov. 30, 2010), 58 pages.
"U.S. Application as Filed", U.S. Appl. No. 13/429,765, (Mar. 23, 2012), 44 pages.
Aggarwal, Manoj et al., "Split Aperture Imaging for High Dynamic Range", *International Journal of Computer Vision*, (Jan. 2004), 8 pages.
Debevec, Paul E., et al., "Recovering High Dynamic Range Radiance Maps from Photographs", *ACM Transaction on Graphics, SIGGRAPH 1997 Conference Proceedings*, San Diego, CA, (1997), 10 pages.
Dudley, Dana et al., "Emerging Digital Micromirror Device (DMD) Applications", *DLPTM Products New Applications, Texas Instruments, Inc., Copyright 2003 Society of Photo-Optical Instrumentation Engineers.*, This paper was published in SPIE Proceedings vol. 4985, (2003), 12 pages.
Durand, Fredo "Fast Bilateral filtering for the Display of High-Dynamic-Range Images", *ACM Transactions on Graphics (TOG), Proceedings of the 29th Annual Conference on Computer Graphics and Interactive Techniques SIGGRAPH -02*, vol. 21, Issue 3, (2002), 10 pages.
Georgiev, "U.S. Application as Filed", U.S. Appl. No. 12/144,411, (Jun. 23, 2008), 63 pages.
Georgiev, et al., "U.S. Application as Filed", U.S. Appl. No. 12/628,437, (Dec. 1, 2009), 114 pages.
Guttosch, Rudolph J., "Investigation of Color Aliasing of High Spatial Frequencies and Edges for Bayer-Pattern Sensors and Foveon X3 Direct Image Sensors", *Tech. Rep., Foveon, 2002*, 8 pages.
Horstmeyer, R et al., "Flexible multimodal camera using a light field architecture.", In *Proceedings ICCP 2009, 2009.*, pp. 1-8.
Horstmeyer, Roarke et al., "Modified light field architecture for reconfigurable multimode imaging", In *Adaptive Coded Aperture Imaging, Non-Imaging, and Unconventional Imaging Sensor Systems. SPIE, 2009.*. 9 pages.
Horstmeyer, Roarke et al., "Pupil plane multiplexing for multi-domain imaging sensors.", In *Society of Photo-Optical Instrumentation Engineers (SPIE) Conference Series*, vol. 7096, Aug. 2008., 10 pages.
Hubel, Paul M., "Foveon Technology and the Changing Landscape of Digital Cameras", *Thirteenth Color Imaging Conference: Color Science and Engineering Systems, Technologies, and Applications*, Scottsdale, Arizona, (Nov. 2005), pp. 314-317.

(56) References Cited

OTHER PUBLICATIONS

Hubel, Paul M., et al., "Spatial Frequency Response of Color Image Sensors: Bayer Color Filters and Foveon X3", *Proceedings of the SPIE*, vol. 5301, (2004), pp. 1-4.

Isaksen, Aaron "Dynamically Reparameterized Light Fields", *Submitted to the Department of Electrical Engineering and Computer Science in partial fulfillment of the requirements for the degree of Master of Science in Electrical Engineering and Computer Science at the Massachusetts Institute of Technology*, (Nov. 2000), 79 pages.

Lippmann, "Reversible Prints", *Academie des sciences*, (Mar. 1908), 3 pages.

Lyon, Richard F., et al., "Eyeing the Camera: into the Next Century", In *Proceedings IS&T/SID 10th Color Imaging Conference*, (2002), 7 pages.

Narasimhan, Srinivasa G., et al., "Enhancing resolution along multiple imaging dimensions using assorted pixels.", *IEEE Trans. Pattern Anal. Mach. Intel I.*, 27(4), (Apr. 2005), pp. 518-530.

Nayar, et al., "High Dynamic Range Imaging: Spatially Varying Pixel Exposures", *IEEE Conference on Computer Vision and Pattern Recognition*, Jun. 2000, vol. 1, pp. 4 72-4 79., 8 pages.

Park, Jong H., et al., "An Ultra Wide Dynamic Range CMOS Image Sensor with a Linear Response", *Proceedings SPIE-IS&T Electronic Imaging, SPIE* vol. 6068, 2006., 8 pages.

Schnechner, Yoav Y., et al., "Generalized mosaicing", In *ICCV.*, pp. 17-25, 2001., 8 pages.

Schechner, Yoav Y., et al., "Generalized Mosaicing: High Dynamic Range in a Wide Field of View", *International Journal of Computer Vision*, 53(3):245-267, (2003), 23 pages.

Schechner, Yoav Y., et al., "Generalized mosaicing: Polarization panorama", *IEEE Trans. Pattern Anal. Mach. Intell.*, 27(4):631-636, 2005., pp. 631-636.

Schechner, Yoaz et al., "Generalized mosaicing: Wide field of view multispectral imaging", *IEEE Trans. Pattern Anal. Mach. Intell.*, 24(1 0):1334-1348, 2002., (Oct. 2002), pp. 1334-1348

Tumblin, Jack et al., "LCIS: A Boundary Hierarchy for Detail-Preserving Contrast Reduction", *ACM Transactions on Graphics, SIGGRAPH 1999 Conference Proceedings*, Los Angeles, CA, pp. 83-90, 1999., pp. 83-90.

"Final Office Action", U.S. Appl. No. 12/957,308, (Nov. 19, 2013), 21 pages.

"Final Office Action", U.S. Appl. No. 12/957,316, (Sep. 26, 2013), 16 pages.

"Non-Final Office Action", U.S. Appl. No. 12/957,312, (Aug. 28, 2013), 17 pages.

"Non-Final Office Action", U.S. Appl. No. 13/288,759, (Sep. 11, 2013), 11 pages.

"Restriction Requirement", U.S. Appl. No. 12/957,326, (Nov. 25, 2013), 6 pages.

"Supplemental Notice of Allowance", U.S. Appl. No. 12/186,392, (Aug. 27, 2013), 2 pages.

"Notice of Allowance", U.S. Appl. No. 12/957,316, Dec. 11, 2013, 13 pages.

"Final Office Action", U.S. Appl. No. 12/957,312, Dec. 13, 2013, 15 pages.

"Non-Final Office Action", U.S. Appl. No. 12/957,322, Jan. 13, 2014, 20 pages.

Chang, et al.,' "Super-Resolution through Neighbor Embedding", Computer Vision and Pattern Recognition, 2004. CVPR 2004. Proceedings of the 2004 IEEE Computer Society Conference, Jul. 2004, 8 pages.

\* cited by examiner

METHODS AND APPARATUS FOR RENDERING OUTPUT IMAGES WITH SIMULATED ARTISTIC EFFECTS FROM FOCUSED PLENOPTIC CAMERA DATA

PRIORITY INFORMATION

This application claims benefit of priority of U.S. Provisional Application Ser. No. 61/377,896 entitled "Methods and Apparatus for Impressionist 4D Filter Based On Random Ray Sampling" filed Aug. 27, 2010, the content of which is incorporated by reference herein in its entirety.

BACKGROUND

Description of the Related Art

In contrast to conventional cameras, light-field, or radiance capturing, cameras sample the four-dimensional (4-D) optical phase space or light-field, and in doing so capture information about the directional distribution of the light rays. This information captured by light-field cameras may be referred to as the light-field, the plenoptic function, or radiance. In computational photography, a light-field is a 4-D record of all light rays in 3-D. Radiance describes both spatial and angular information, and is defined as density of energy per unit of area per unit of stereo angle (in radians). A light-field camera captures radiance; therefore, light-field images originally taken out-of-focus may be refocused, noise may be reduced, viewpoints may be changed, and other light-field effects may be achieved.

The light-field is the radiance density function describing the flow of energy along all rays in three-dimensional (3D) space. Since the description of a ray's position and orientation requires four parameters (e.g., two-dimensional positional information and two-dimensional angular information), the radiance is a four-dimensional (4D) function. This function may be referred to as the plenoptic function. Image photosensor technology, on the other hand, is only two-dimensional, and light-field imagery must therefore be captured and represented in flat (two dimensional) form. A variety of techniques have been developed to transform and capture the 4D radiance in a manner compatible with 2D photosensor technology. This may be referred to as a flat representation of the 4D radiance (or light-field), or simply as a flat.

SUMMARY

Methods, apparatus, and computer-readable storage media for simulating artistic effects in images rendered from plenoptic data are described. Embodiments of a rendering technique that applies random ray sampling and a four-dimensional (4D) filter to simulate artistic effects, such as impressionistic effects, in output images. In embodiments, an impressionistic-style effect may be generated in output images of a rendering process by an "impressionist" 4D filter applied to the microimages in a flat captured with focused plenoptic camera technology. In embodiments of the rendering technique, individual pixels are randomly sampled from blocks of pixels in the microimages and assembled to generate an "impressionistic" artistic effect.

Embodiments may receive a radiance image (flat) captured using a focused plenoptic camera. The microimages may then be processed to render an output image according to the described rendering technique. In each microimage, the pixels are processed in blocks of m×n pixels (e.g., 3×3 blocks of pixels). From each block, a pixel is randomly selected via a randomization technique. This has the effect of randomly shifting pixels. When the depth of focus is changed, or the viewpoint is changed, 3D structures become blurry or sharp in the image. The blurring may have a special value or characteristic. The blurring may look interesting, similar to the artistic style known as impressionist that can be seen in impressionist paintings; the image may include spots suggestive of those seen in at least some impressionist paintings. However, to maximize this effect, certain adjustments of values used in rendering may be made, for example by applying a filter or weighting when sampling pixels for the output image, and/or other image processing techniques or functions may be applied.

Conventional 2D image editing tools do not provide the artistic effect as described herein, because the effect results from or relies on the 4D nature of ray space captured in a radiance image. The blurry area, or out of focus area, in an image so generated from a radiance image captured with a focused plenoptic camera is not really blurry but instead may appear like broken glass in little pieces. Moreover, background can be seen between the pieces, which is not possible with 2D images.

The random selection process selects individual pixels from blocks of pixels, and thus some pixels are removed. However, removing pixels does not damage the image or significantly impact the quality of output images rendered from the data because of redundancy of pixels in the microimages. However, if there are some blank spots, a technique such as interpolation may be applied to fill in the gaps.

Figure 1A:
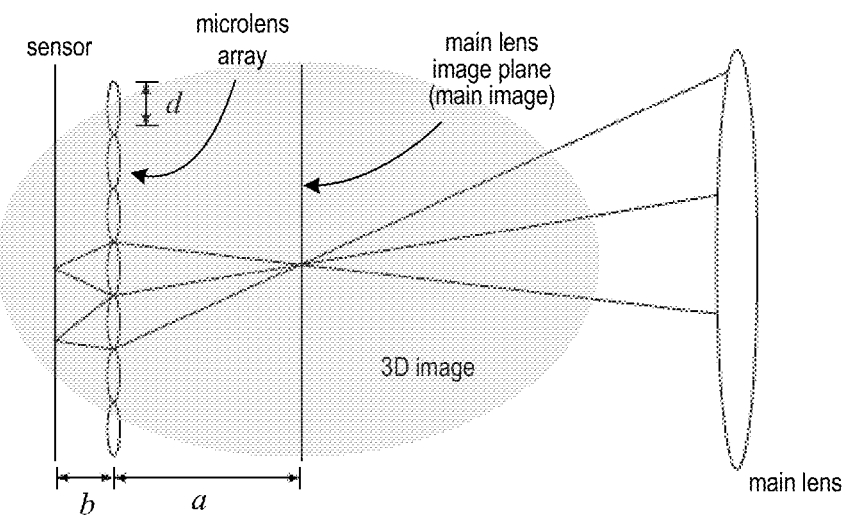
FIG. 1A illustrates an example focused plenoptic camera (Keplerian telescopic case), according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Methods, apparatus, and computer-readable storage media for simulating artistic effects in images rendered from plenoptic data are described. Raw images or flats captured using focused plenoptic camera technology consist of a plurality of microimages, with each microimage representing a separate, slightly different image of the scene captured from the main image plane of the camera, near or on which the microimages are focused. The flat is a radiance image that captures radiance or angular information as well as color or grayscale. The microimages may be appropriately processed to render output images that are combinations or blendings of multiple microimages; since the flats are radiance images, radiance processing techniques may be applied, for example refocusing at different depths from a single image captured of a scene. Note that a given pixel in a given microimage corresponds to pixels in neighboring microimages or other microimages; however, due to the design of the focused plenoptic camera, the captured image is shifted slightly in neighboring microimages.

Embodiments of a technique for rendering focused plenoptic camera data are described in which an artistic effect such as an impressionistic-style effect may be generated in output images of a rendering process by randomly selecting some pixels from the microimages in a flat captured with an embodiment of the focused plenoptic camera and applying an "impressionist" 4D filter to the randomly selected pixels. This rendering technique may be referred to as an impressionist rendering technique. In embodiments of the impressionist rendering technique for rendering focused plenoptic camera data, individual pixels are randomly sampled from blocks of pixels in the microimages and assembled to generate the "impressionistic" artistic effect that can clearly be seen in the example output images provided in FIGS. 8 through 21.

This document first briefly describes focused plenoptic camera technology, and then describes embodiments of the impressionist technique for rendering focused plenoptic camera data.

Focused Plenoptic Camera Technology

Focused plenoptic camera technology and rendering techniques for focused plenoptic camera data are described in U.S. patent application Ser. No. 12/474,112, entitled "Methods and Apparatus for Full-Resolution Light-Field Capture and Rendering" filed May 28, 2009, the content of which is incorporated by reference herein in its entirety.

Figure 1B:
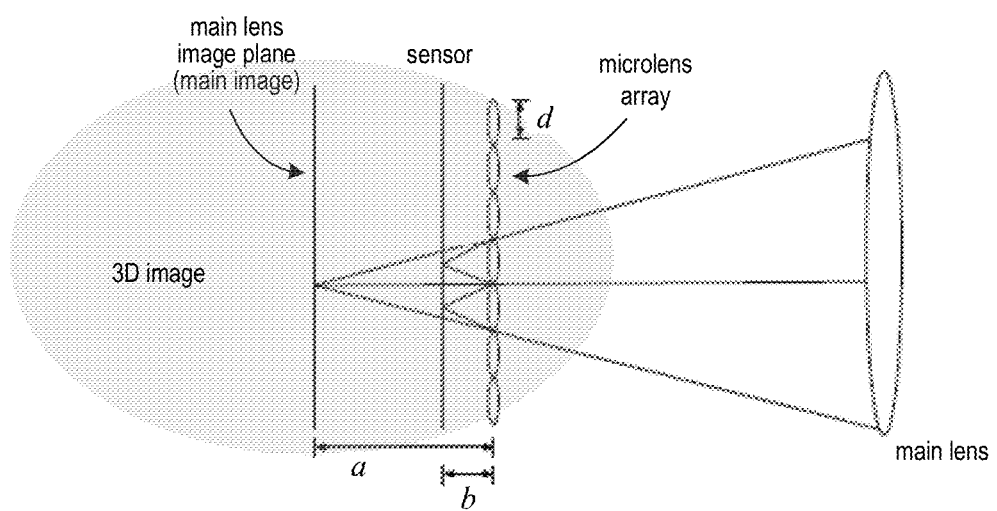
FIG. 1B illustrates an example focused plenoptic camera (Galilean telescopic case), according to some embodiments.

FIGS. 1A and 1B illustrate an example focused plenoptic camera, according to some embodiments. Note that the components shown in FIGS. 1A and 1B are not necessarily to scale relative to each other, nor are the distances between the components necessarily to scale, nor are the sizes of the components necessarily to scale. The focused plenoptic camera may include at least a main lens, a microlens array, and a photosensor. However, in the focused plenoptic camera, the array of "microcameras" is focused on an image plane of the main camera lens instead of at infinity, as in conventional plenoptic cameras. With the focused plenoptic camera, each microcamera is reimaging the main lens image onto the photosensor. The microlenses form an array of true images of the main lens image as a relay system.

The ovoid shaded area in FIGS. 1A and 1B represent the three-dimensional (3D) image formed inside the camera by the main camera lens. Note that this 3D image may extend behind the microlenses. FIG. 1A illustrates the Keplerian telescopic case where the image plane being imaged is in front of the microlenses. If the main lens forms an image behind the microlenses, it is still possible to focus the microlenses on that virtual image so that they form a real image on the photosensor. This is the Galilean telescopic case (see FIG. 1B). In both the Keplerian telescopic case and the Galilean telescopic case, the microlens imaging is described by the lens equation:

$$\frac{1}{a} + \frac{1}{b} = \frac{1}{f}$$

with, respectively, positive a (Keplerian telescopic case) or negative a (Galilean telescopic case). When remapped onto the photosensor, the image of the main lens is reduced in size. This reduction may be denoted as:

$$m = \frac{a}{b}$$

As a result of this scaling, the spatial resolution of the radiance captured by the focused plenoptic camera is a function of the resolution of the microlens images and the amount of overlap in rendering, and not of the number of microlenses. This decoupling of resolution and number of microlenses is a critical observation that distinguishes the focused plenoptic camera from the conventional plenoptic camera.

Another difference between the conventional plenoptic camera and the focused plenoptic camera is in the nature of the information that is captured by each microlens. In the conventional plenoptic camera, each microlens images one position in the scene, capturing all of the angular information there. In the focused plenoptic camera, different microlenses capture the same position; angular information is spread across microlenses. Accordingly, to render flats captured with the focused plenoptic camera, a rendering algorithm integrates across microlens images, rather than within a single microlens image. That is, assuming that the task is "imaging the image" that is in focus, the rendering algorithm integrates the points in the microlenses that correspond to the same position in the image by overlapping them at a fixed pitch. See U.S. patent application Ser. No. 12/474,112 for examples of basic rendering algorithms for flats captured with embodiments of the focused plenoptic camera.

Figure 2A:
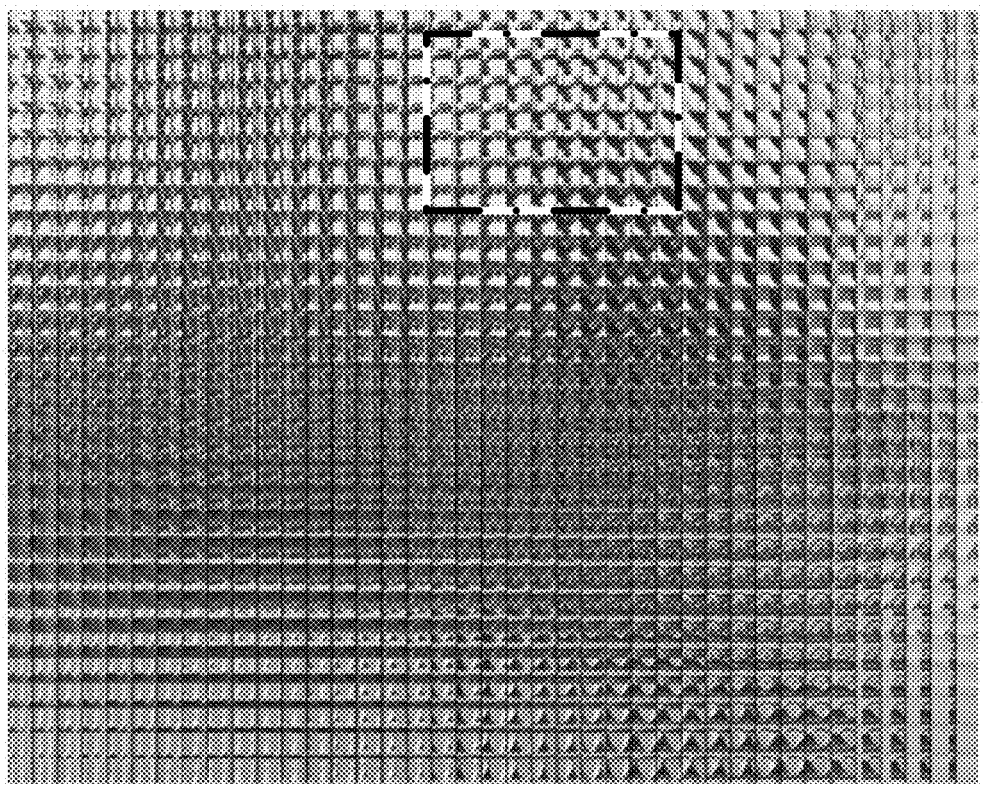
FIG. 2A shows a portion of a light-field image, or flat, captured by focused plenoptic camera technology, according to some embodiments.
Figure 2B:
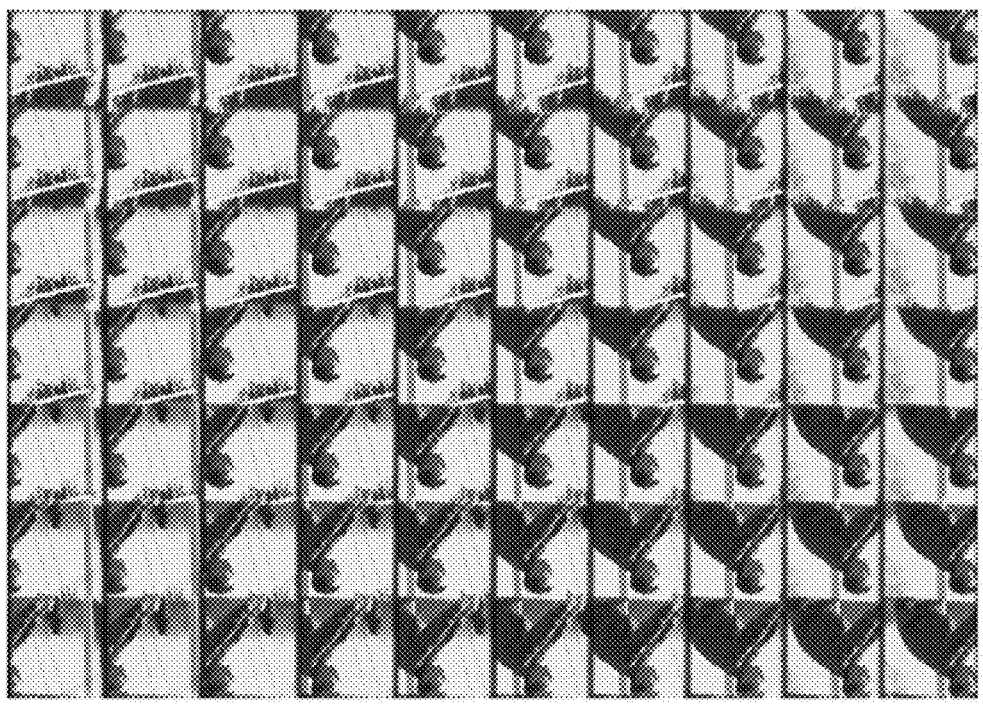
FIG. 2B is a zoom-in to the region indicated by the rectangle in FIG. 2A.
Figure 2C:
FIG. 2C shows an example image rendered from the focused plenoptic camera data shown in FIGS. 2A and 2B according to a basic focused plenoptic camera rendering algorithm according to some embodiments.

FIG. 2A shows a portion of a light-field image, or flat, captured by focused plenoptic camera technology, according to some embodiments. FIG. 2B is a zoom-in to the region indicated by the rectangle in FIG. 2A. Note that a square main lens aperture was used to provide efficient use of photosensor space. However, other geometric shapes may be used for the apertures, such as circles or rectangles. FIG. 2C shows an example image rendered from the focused plenoptic camera data shown in FIGS. 2A and 2B according to a basic focused plenoptic camera rendering algorithm according to some embodiments, for example a rendering technique as described in U.S. patent application Ser. No. 12/474,112.

The "ba" Microlens System

Figure 3:
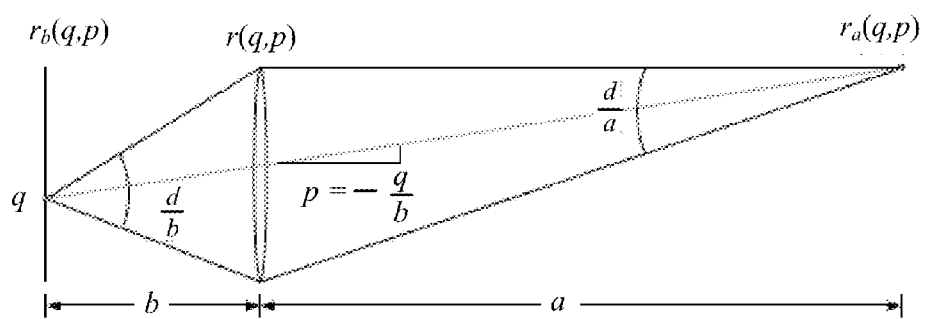
FIG. 3 illustrates the "ba" microlens system of the focused plenoptic camera.

FIG. 3 illustrates the "ba" microlens system of the focused plenoptic camera, for example as illustrated in FIGS. 1A and 1B. Consider one microlens and let $r_a(q, p)$ be the radiance at the focal plane of the main lens and $r_b(q, p)$ be the radiance at the photosensor behind that microlens. The image from the main lens is assumed to be focused on the plane distance a in front of the microlenses, i.e., the imaging plane of the microlenses. Each microlens focuses a portion of the image plane onto the photosensor.

Figure 4:
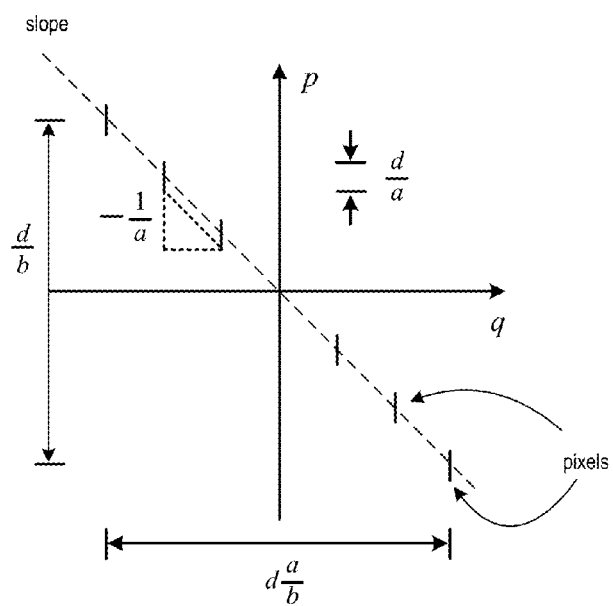
FIG. 4 illustrates sampling radiance by a single microlens.

FIG. 4 illustrates the way that radiance is sampled by a single microlens (infinitely small pixels and microlens aperture d are assumed). This Figure illustrates sampling of the radiance $r_a(q, p)$ by a single microlens represented in the two-dimensional (q, p) plane. Each pixel samples a single position in q (the positional coordinate) and samples a span of d/a in p (the directional coordinate). The entire microlens samples a span of da/b in q (the spatial coordinate).

Figure 5:
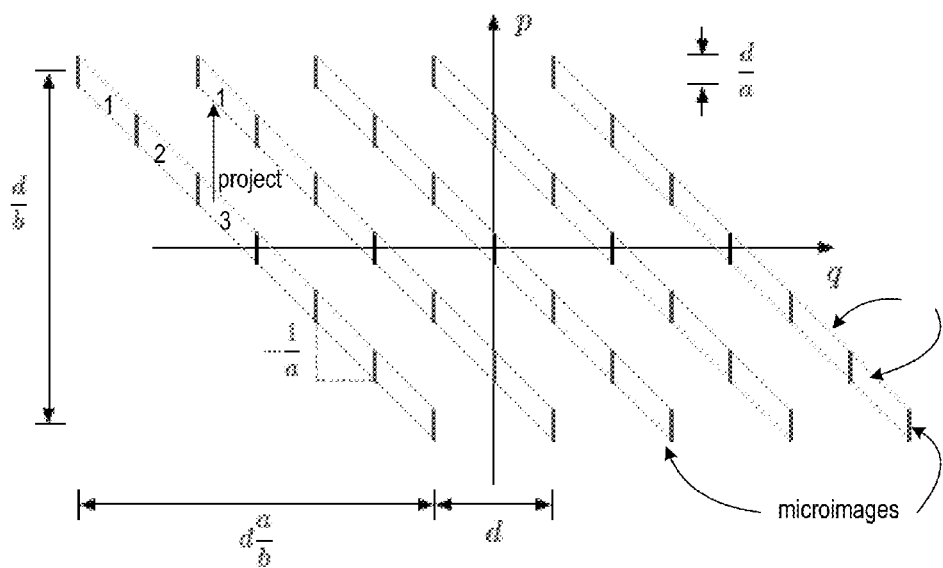
FIG. 5 illustrates sampling of the radiance $r_a(q, p)$ by a microlens array represented in the two-dimensional (q, p) plane.

FIG. 5 illustrates sampling of the radiance $r_a(q, p)$ by a microlens array represented in the two-dimensional (q, p) plane.

Impressionist Rendering Technique

Embodiments of an impressionist rendering technique may receive a radiance image (flat) captured using focused plenoptic camera technology as described above. The microimages may then be processed to render an output image according to the impressionist rendering technique. In the impressionist rendering technique, for each microimage of the flat, the pixels are processed in blocks of m×n pixels (e.g., 3×3 blocks of pixels). From each block, a pixel is randomly selected via a randomization technique. This has the effect of randomly shifting pixels. When the depth of focus is changed, or the viewpoint is changed, 3D structures become blurry or sharp in the image. The blurring may have a special value or characteristic. The blurring may look interesting, similar to the artistic style known as impressionist that can be seen in impressionist paintings; the image may include spots suggestive of those seen in at least some impressionist paintings. However, to maximize this effect, certain adjustments of values used in rendering may be made, for example by applying a filter or weighting when sampling pixels for the output image, and/or by applying other image processing techniques or functions.

Conventional 2D image editing tools do not provide the artistic effect generated by the impressionist rendering technique, because the effect results from or relies on the 4D nature of ray space captured in a radiance image. The blurry area, or out of focus area, in an image so generated from a radiance image captured with a focused plenoptic camera is not really blurry but instead may appear like broken glass in little pieces.

Embodiments of the impressionist rendering technique may randomly select individual pixels from blocks of pixels, and thus some pixels are removed from the flat. However, removing these pixels does not significantly damage the image or impact the quality because of redundancy of pixels in the microimages. There are many microimages in a flat that share common (but not identical) pixels; for example, in some embodiments, 25 microimages may share common pixels. Thus, if some pixels are removed, a good representation may still be produced. Because the pixels are randomly selected, the removed pixels are randomly removed; therefore, generally, the same pixels are not removed from all of the microimages. However, if there are some blank spots, a technique such as interpolation may be applied to fill in the gaps.

In at least some embodiments, the input image (flat) may be split into m×n blocks of pixels, for example 3×3 blocks, each including N pixels, where N=m×n. For example, a 3×3 block will contain nine pixels. While a 3×3 block is used by way of example, other sizes of blocks may be used, and other shapes than square blocks (e.g., rectangular blocks) may be used. For each block, one out of the N pixels is randomly selected. Only those randomly selected pixels are used to render output images.

At least some embodiments may use a thin sampling kernel so that only one or a few pixels from the randomly selected pixels are sampled for each final pixel in the output image. For example, in at least some embodiments, a Gaussian kernel defined as:

$$\text{Exp}(-\alpha r^2)$$

may be used, where r is the distance to the corresponding pixel center in units, and where distance between neighboring pixels is 1. Alpha (α) is a value that is defined by the equation. In embodiments, the value of α will generally be 10 or larger to be practical. Typically, a value of α between 20 and 100 provides good results. In some embodiments, a value of or near 20 for α may provide best results.

By employing a thin sampling kernel, the kernel is likely to not select a pixel from most microimages, and generally samples just one or two closest pixels in one or two microimages. This produces very high resolution in the resulting rendered image because the resolving technique generally uses each pixel only once and does not mix many if any pixels, so resolution is not lost.

Figure 6:
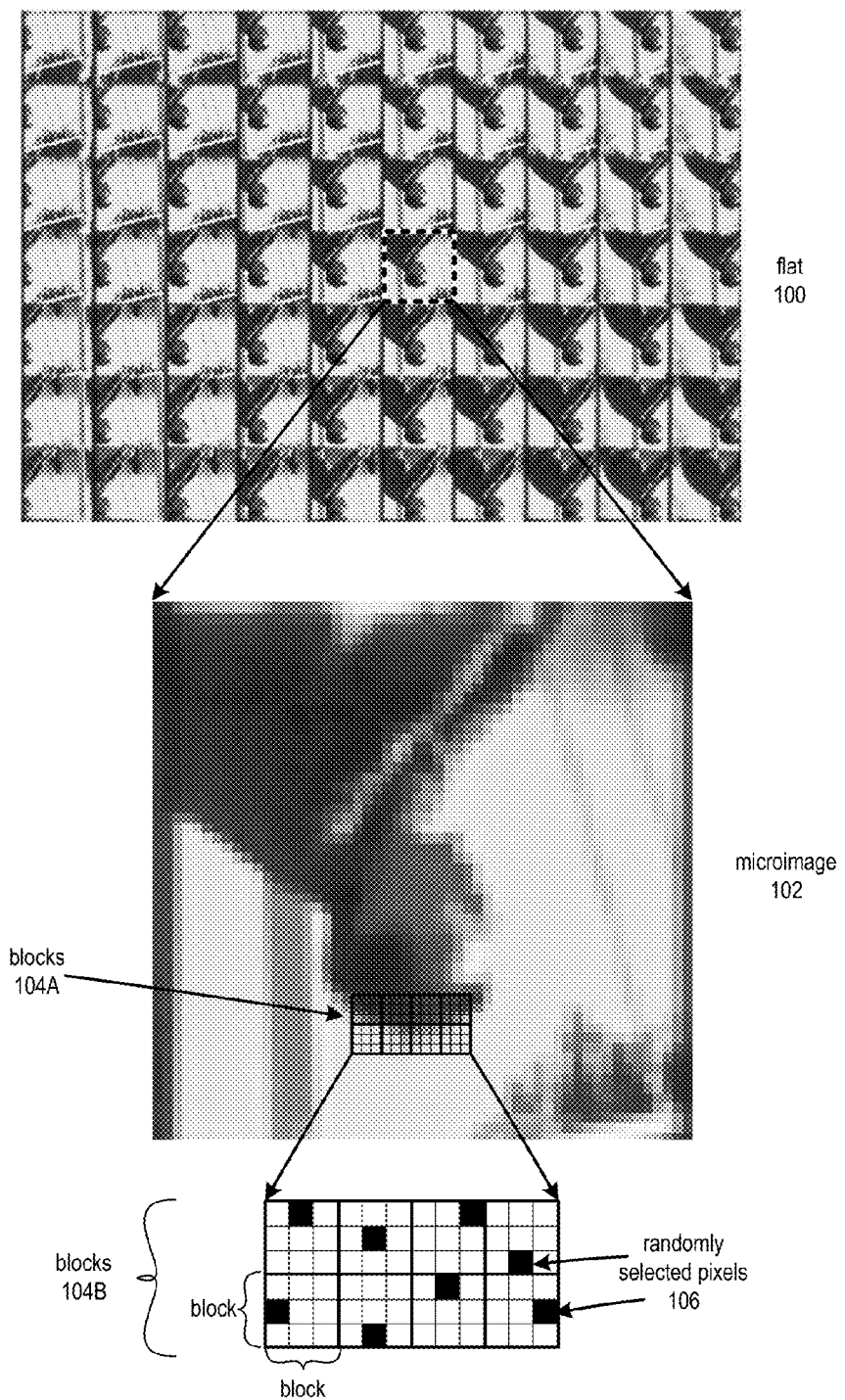
FIG. 6 illustrates randomly selecting pixels in a flat, according to at least some embodiments.

FIG. 6 illustrates randomly selecting pixels in a flat, according to at least some embodiments. Flat 100 represents an example portion of an example input flat captured using focused plenoptic camera technology; this example portion includes 70 microimages, each corresponding to a microlens in the microlens array of the focused plenoptic camera.

Microimage 102 represents a zoom-in to one of the microimages in flat 100. Each microimage may be divided into a plurality of blocks of pixels, for example 3×3 blocks of pixels, each including nine pixels. Blocks 104A illustrates a portion of the blocks in microimage 102. Blocks 104B illustrates that one pixel in each block has been randomly selected according to a randomization technique; the randomly selected pixels 106 are shown as black squares.

The random selection of pixels from blocks described above is performed for each microimage in the entire flat. In some embodiments, the randomly selected pixels are retained in the flat, while the other (non-selected) pixels are removed. Note that the original flat may be retained; this removal of pixels may be performed by generating a new image that only includes the randomly selected pixels, with the non-selected pixels removed. Other techniques may be used, however.

Figure 7:
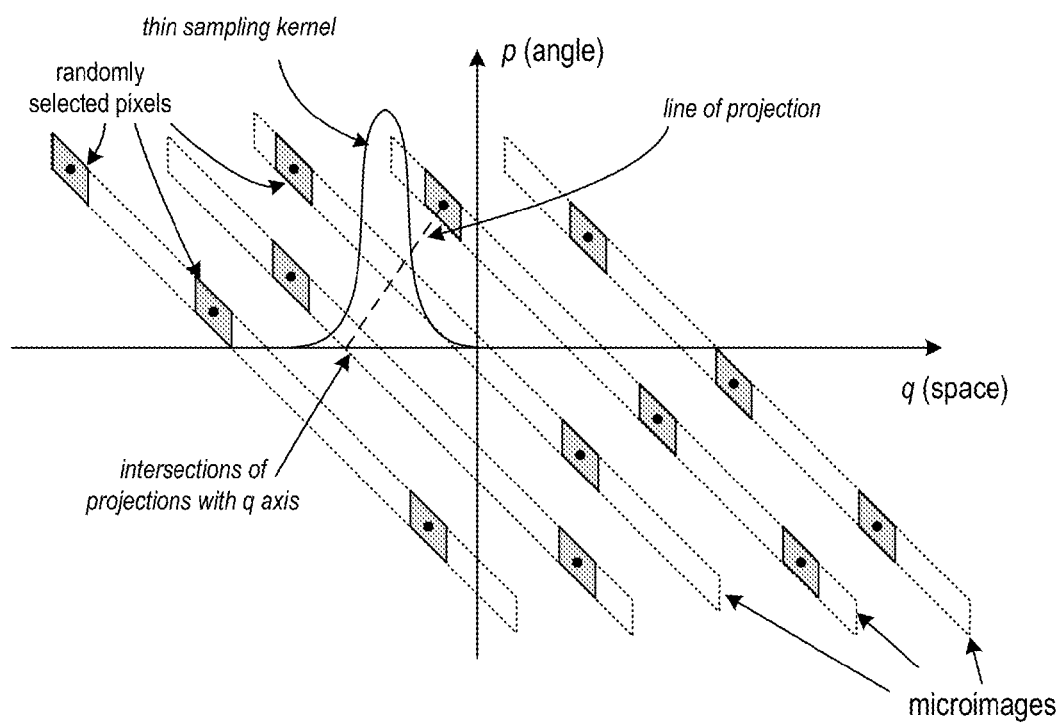
FIG. 7 illustrates a rendering technique that may be applied to generate an output image with artistic effects from a flat with randomly selected pixels and with the non-selected pixels removed, according to at least some embodiments.

FIG. 7 illustrates a rendering technique that may be applied to generate an output image with artistic effects such as an impressionistic effect from a flat with randomly selected pixels, with the non-selected pixels removed, according to at least some embodiments. The microimages are viewed as a stack in (q, p) space, and the Figure shows an example line of projection through the microimages, the angle of which is determined by a current depth of focus; this angle may be referred to as the angle of projection. The shaded parallelograms represent the randomly selected pixels. Note that the pixels in a given microimage are sparse, and thus there is not much if any overlap between pixels in the microimages. The rendering technique needs to determine what value, if any, to read at each microimage for a pixel in q space (that is, for a pixel in the output image). To do this, lines of projection are formed to project the pixels in the microimages onto the q axis. Note that the example line of projection from a pixel on the second-from-right microimage does not pass through pixels on other microimages, and in many cases may not even pass near pixels on other microimages, as these other pixels have been removed as describe above in reference to FIG. 6.

A thin sampling kernel is used to sample the pixel values projected onto the q axis from the microimages. Embodiments take a pixel from q, and draw the projection line (according to an angle of projection) that crosses many microimages in the microimage stack. In each microimage, according to the distance of pixels, if any, in the microimage to this intersectional line, the thin sampling kernel gives weights to the pixels, if present. By employing a thin sampling kernel, the kernel is likely to select no pixel in most microimages, and generally samples just one or two closest pixels from one or two microimages.

A thin sampling kernel may be used so that one or only a few pixels are sampled for each point in the output image. In some embodiments, a very thin sampling kernel may be used, so that only one pixel is sampled for each point in the output image. In some embodiments, a user interface may allow the user to specify the size of the sampling kernel that is used.

In at least some embodiments, the thin sampling kernel may be a Gaussian kernel defined as:

$$\text{Exp}(-\alpha r^2),$$

where r is the distance to the corresponding pixel center in units, and where distance between neighboring pixels is 1.

Once the calculations are performed for one such line, the result is a value according to the kernel. This value yields the pixel value of this point on the q axis (i.e., for this point in the output image). In some embodiments, the value may be averaged, if necessary, and/or normalized, e.g. divided by a normalization metric for the kernel, to get the pixel value of this point on the q axis.

The above rendering technique employing a thin sampling kernel is performed for all the pixels in the output image to generate the final output image, examples of which are shown in FIGS. 8 through 21.

Figure 8:
FIG. 8 shows an image produced using an embodiment of an impressionist technique for rendering focused plenoptic camera data.
Figure 9:
FIGS. 9 through 12 show zoom-ins to the image of FIG. 8.
Figure 10:
Figure 11:
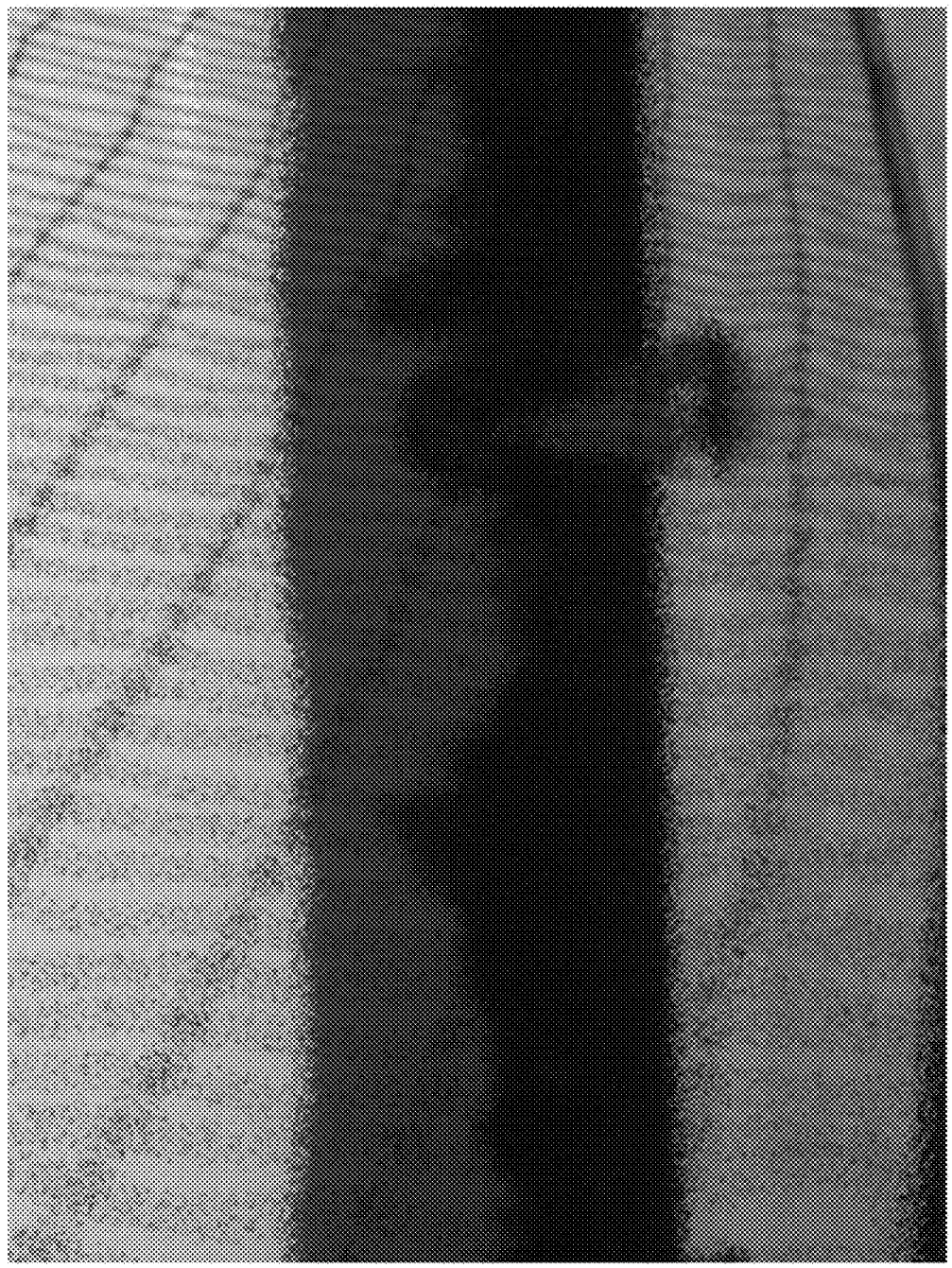
Figure 12:

FIG. 8 shows an image produced using the above-described sampling technique and rendering technique employing a thin sampling kernel. Notice that the foreground out-of-focus objects are split into random pieces, and background can be seen between them. This effect is not possible with conventional 2D images; it is possible only in the 4D ray space provided by a radiance camera. A zoom in to the rectangle on the right of the full image is shown. A sequence of zoomed in and refocused after-the-fact images generated according to at least some embodiments are shown in FIGS. 9 through 15. FIG. 9 shows a full image focused on the net. FIG. 10 shows a zoom in, still focused on the net. FIG. 11 shows a closer zoom in still focused on the net. FIG. 12 shows an even closer zoom in still focused on the net.

Figure 13:
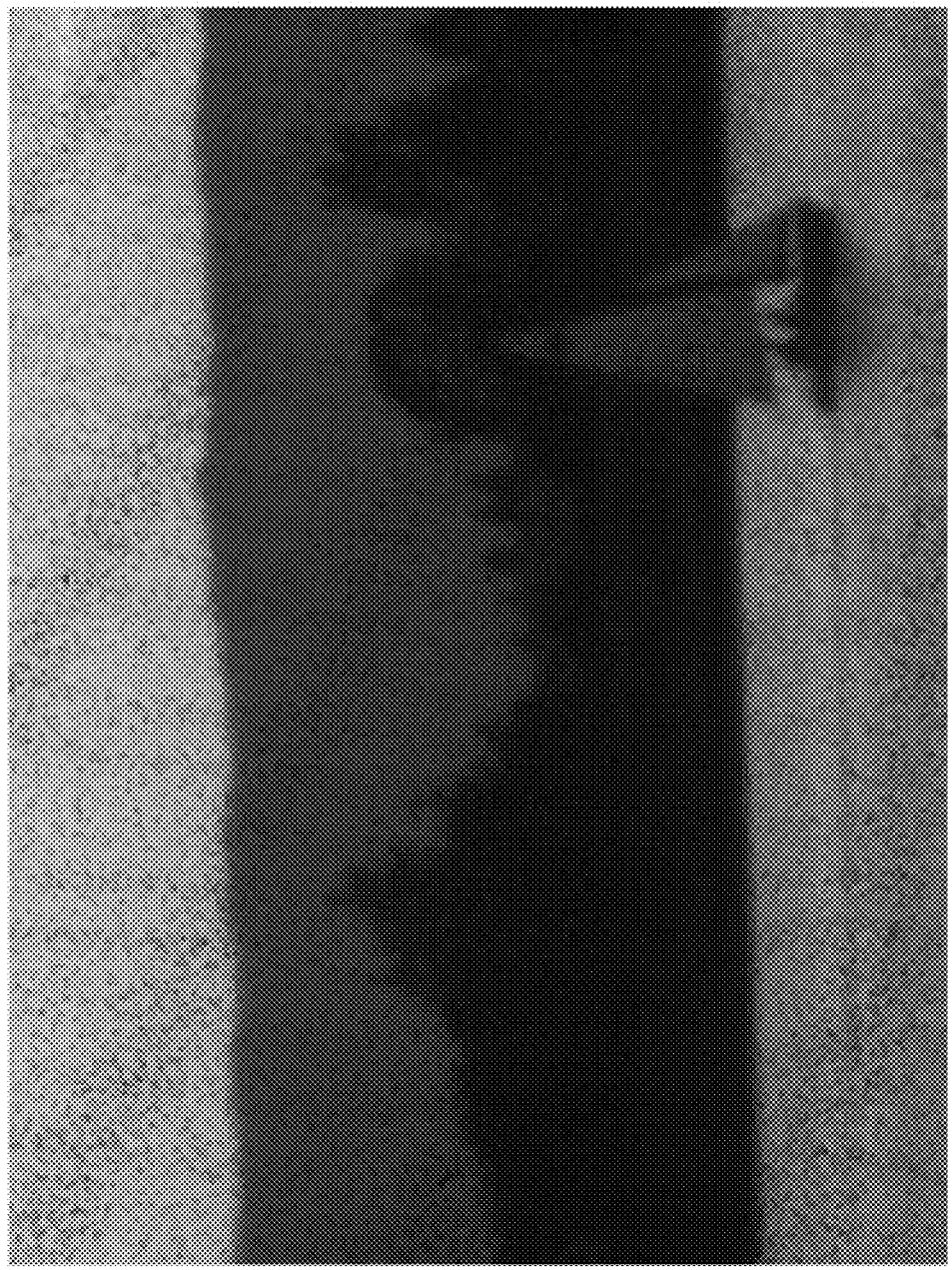
FIG. 13 shows an image generated from the same flat (radiance image) as the image in FIGS. 9 through 12, but focused at a different depth.

FIG. 13 shows an image generated from the same flat (radiance image) as the image in FIGS. 9 through 12, but focused at a different depth (on the boat). Note that the net appears as if it is made of black particles, and background can be seen between them.

Figure 14:
FIG. 14 illustrates that, with a very thin sampling kernel, only one pixel is sampled for each point in the output image, according to some embodiments.
Figure 15:
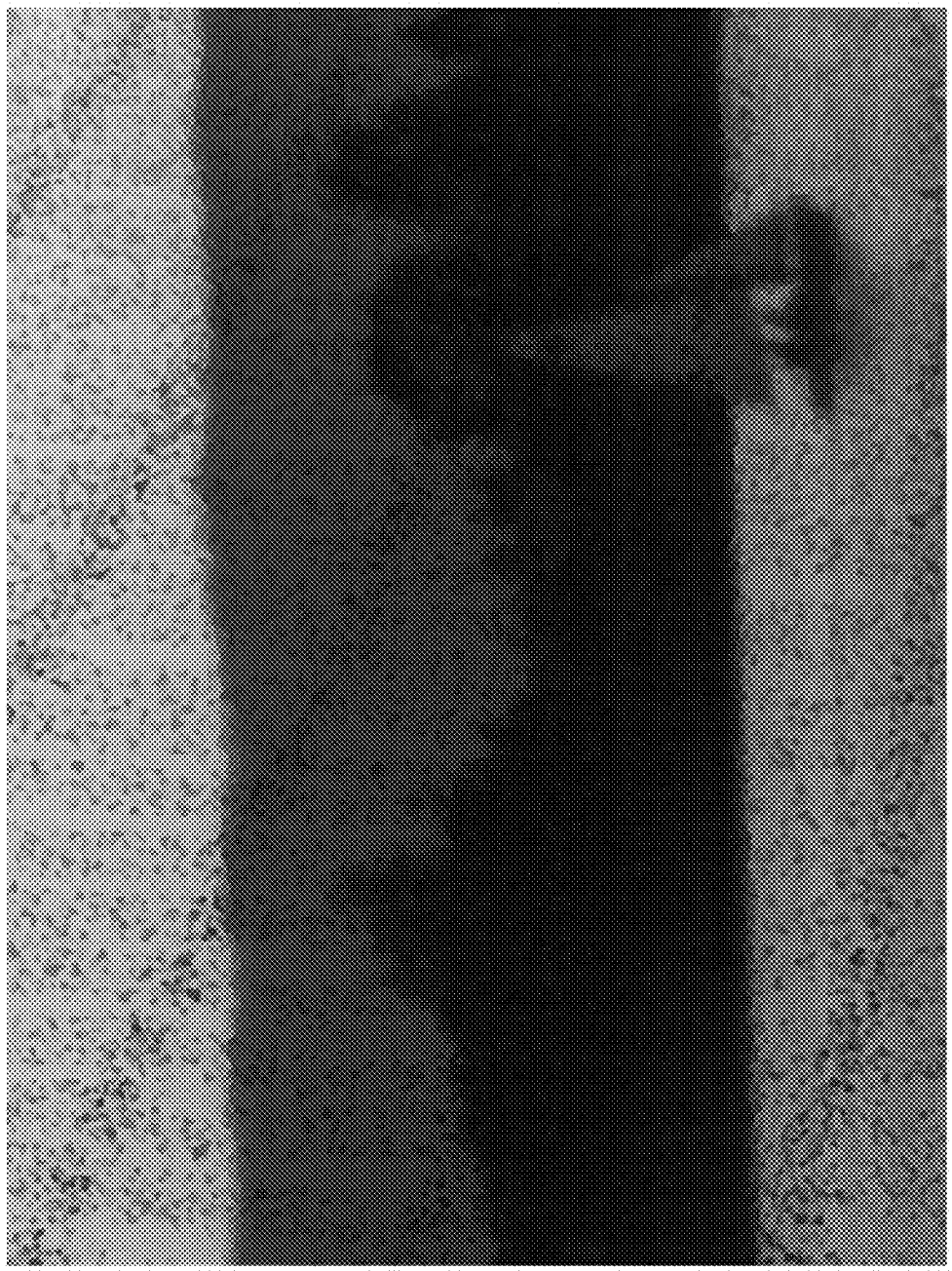
FIG. 15 shows a zoom out in the case of the thin kernel illustrated in FIG. 14.

FIG. 14 illustrates that, in some embodiments, with a very thin sampling kernel, only one pixel is sampled for each point in the output image. The patches look interesting and natural as an artistic style of rendering. FIG. 15 shows a zoom out in the case of the very thin kernel illustrated in FIG. 14.

FIGS. 16 through 21 are additional example images demonstrating the effect that may be achieved with embodiments of the impressionist technique described herein. Note that, using the central pixel of every m×n block, a low resolution sensor (e.g., a 4.3 megapixel sensor) may be simulated. These images also illustrate results generated using different values of α in the sampling kernel. Note that, in some embodiments, a Gaussian kernel defined as:

$$\text{Exp}(-\alpha r^2)$$

may be used, where r is the distance to the corresponding pixel center in units, and where distance between neighboring pixels is 1.

Figure 16:
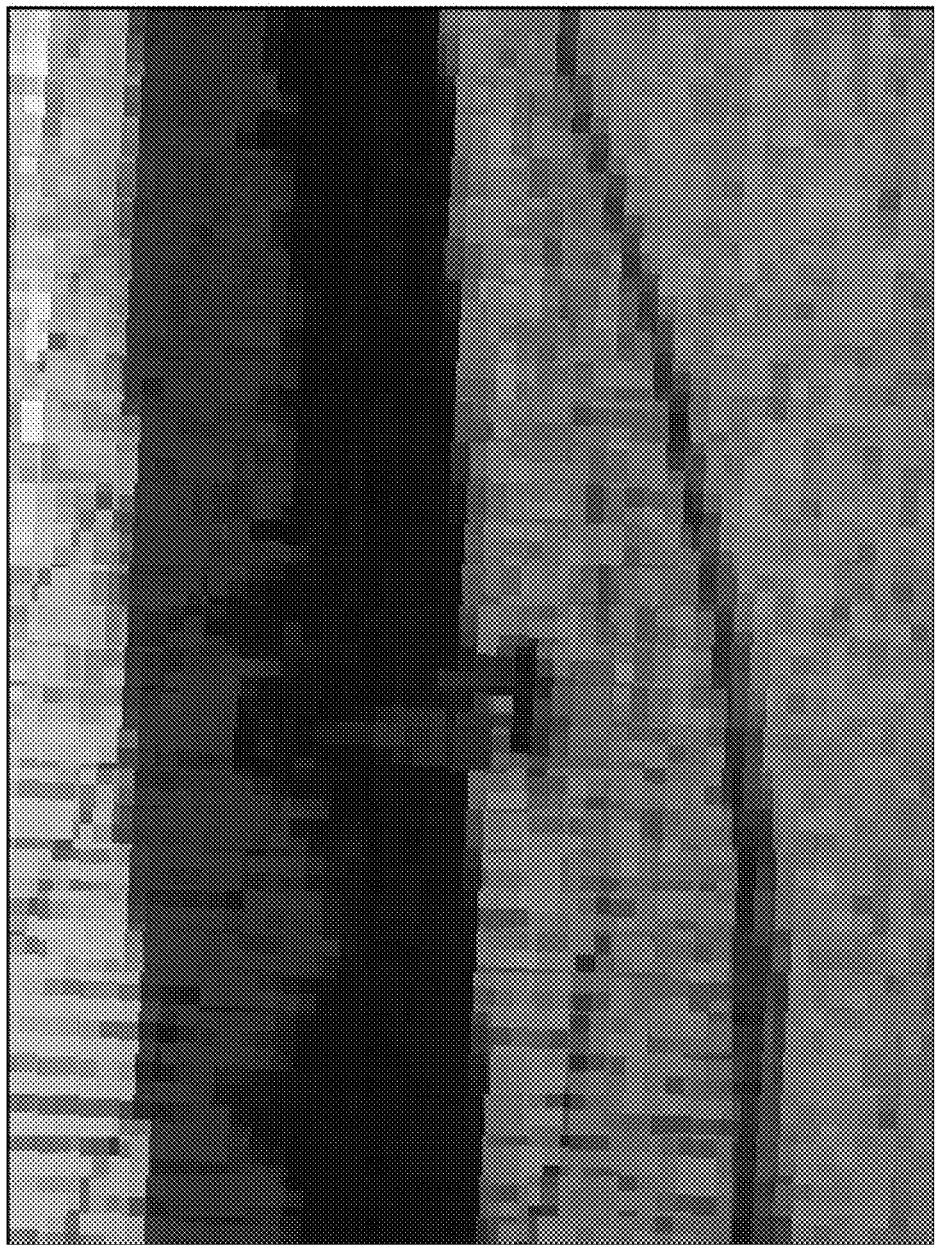
FIGS. 16 through 21 are additional example images demonstrating effects that may be achieved with embodiments of the impressionist rendering technique.
Figure 17:
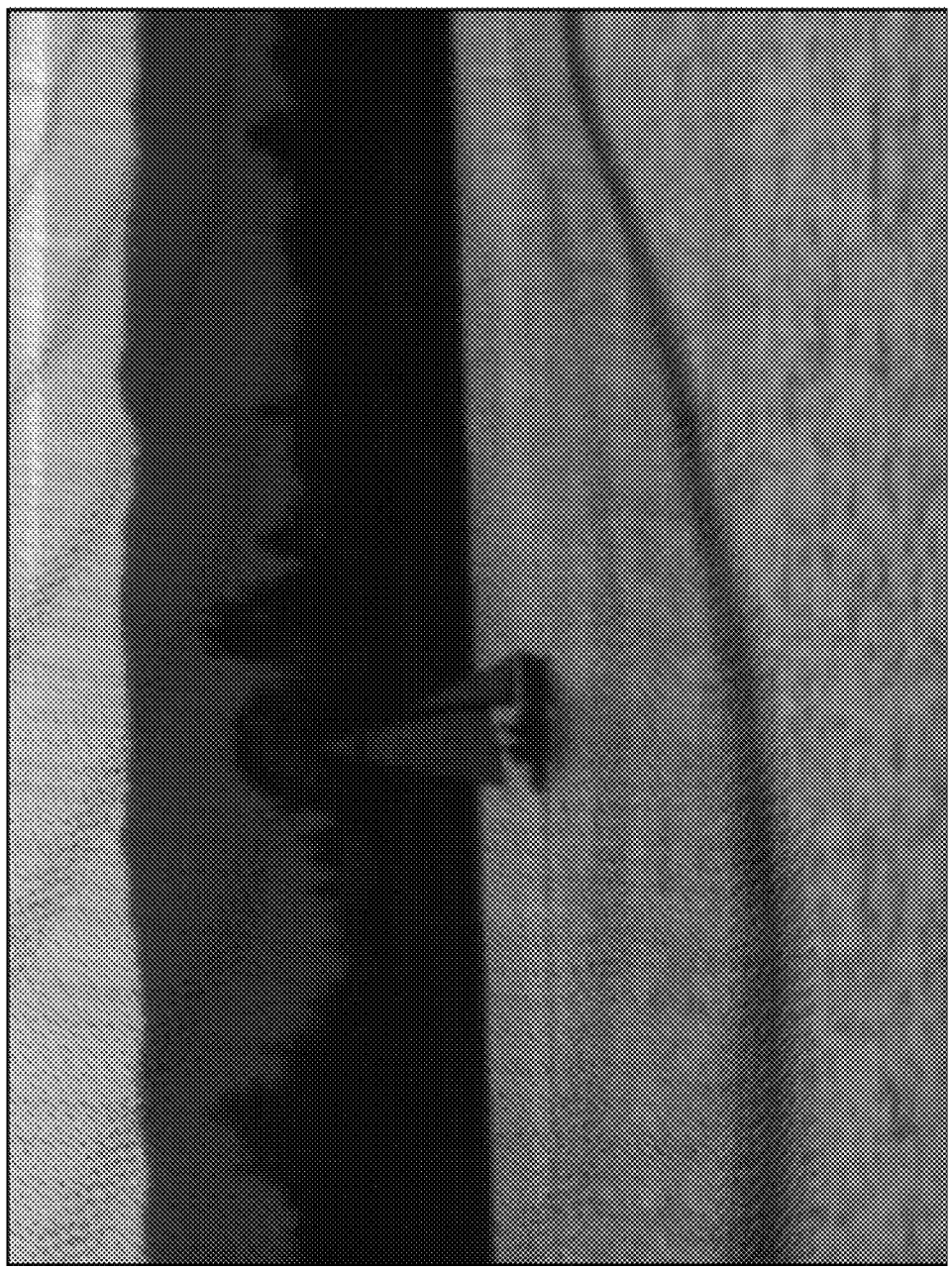
Figure 18:
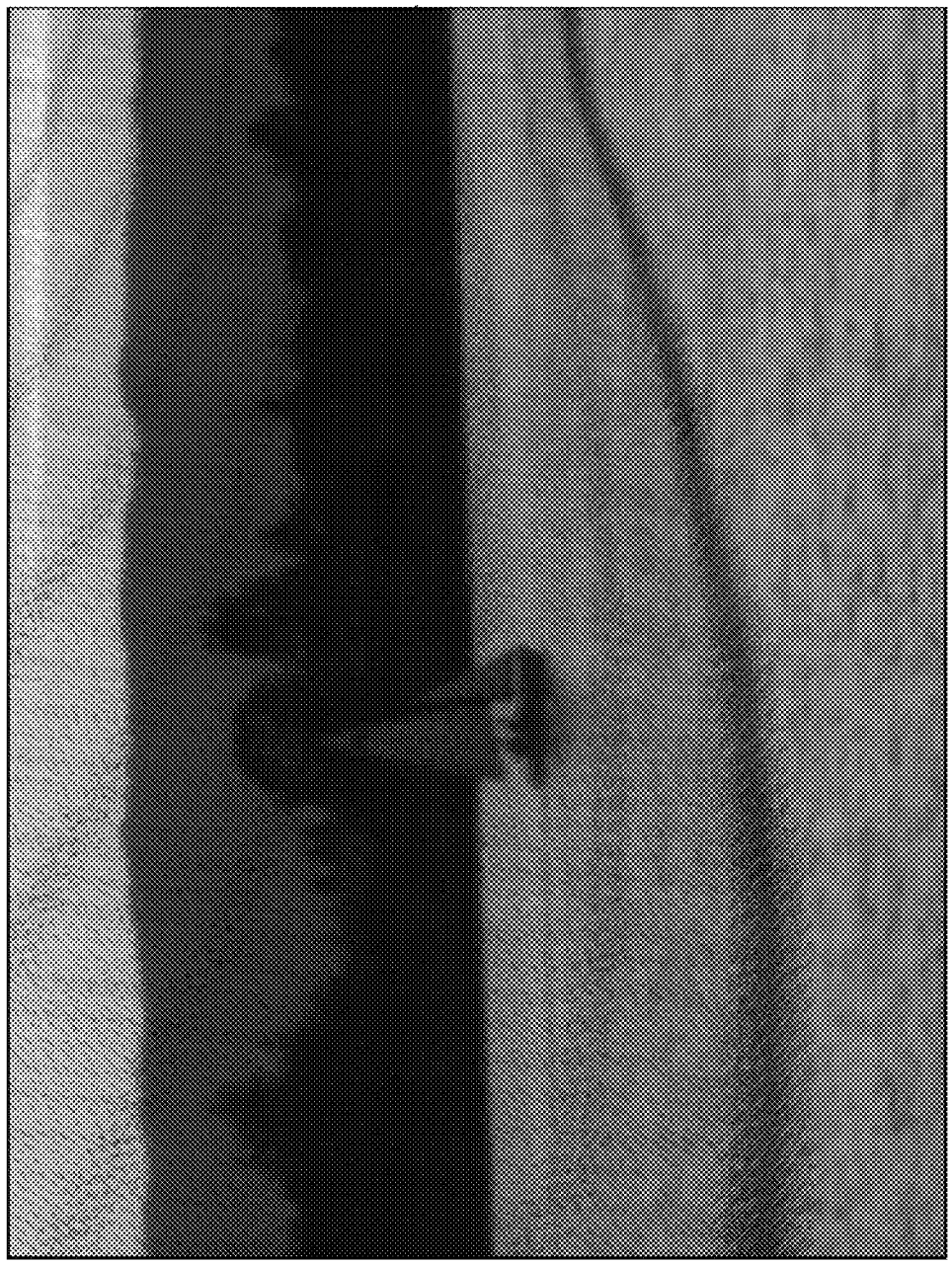

FIG. 16 shows example results according to conventional focused plenoptic camera rendering. FIG. 17 is rendered from the same data as FIG. 16 using an embodiment of the impressionist technique described herein, with the value of α=16. FIG. 18 is rendered from the same data as FIG. 16 using an embodiment of the impressionist technique described herein, with the value of α=160.

Figure 19:
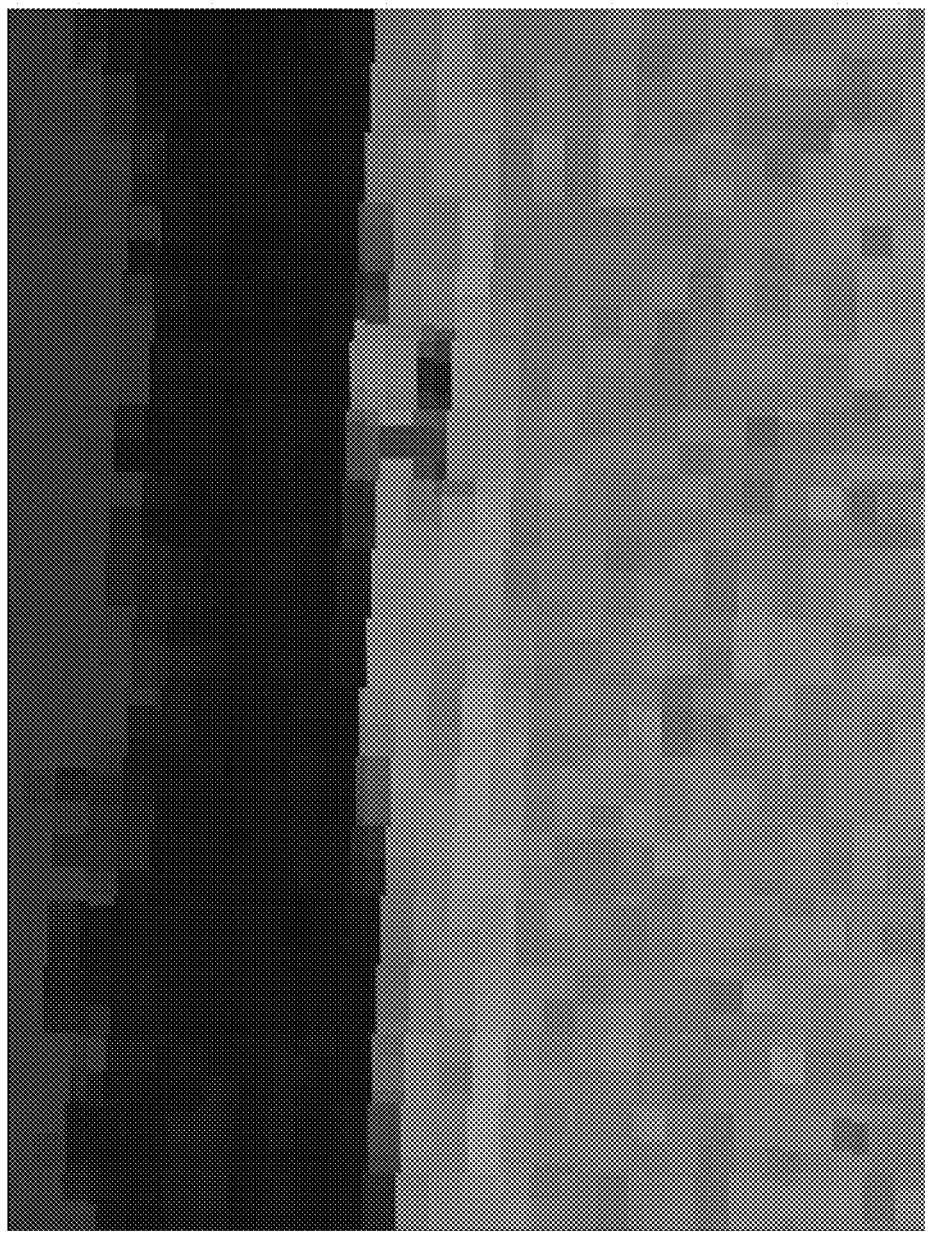
Figure 20:
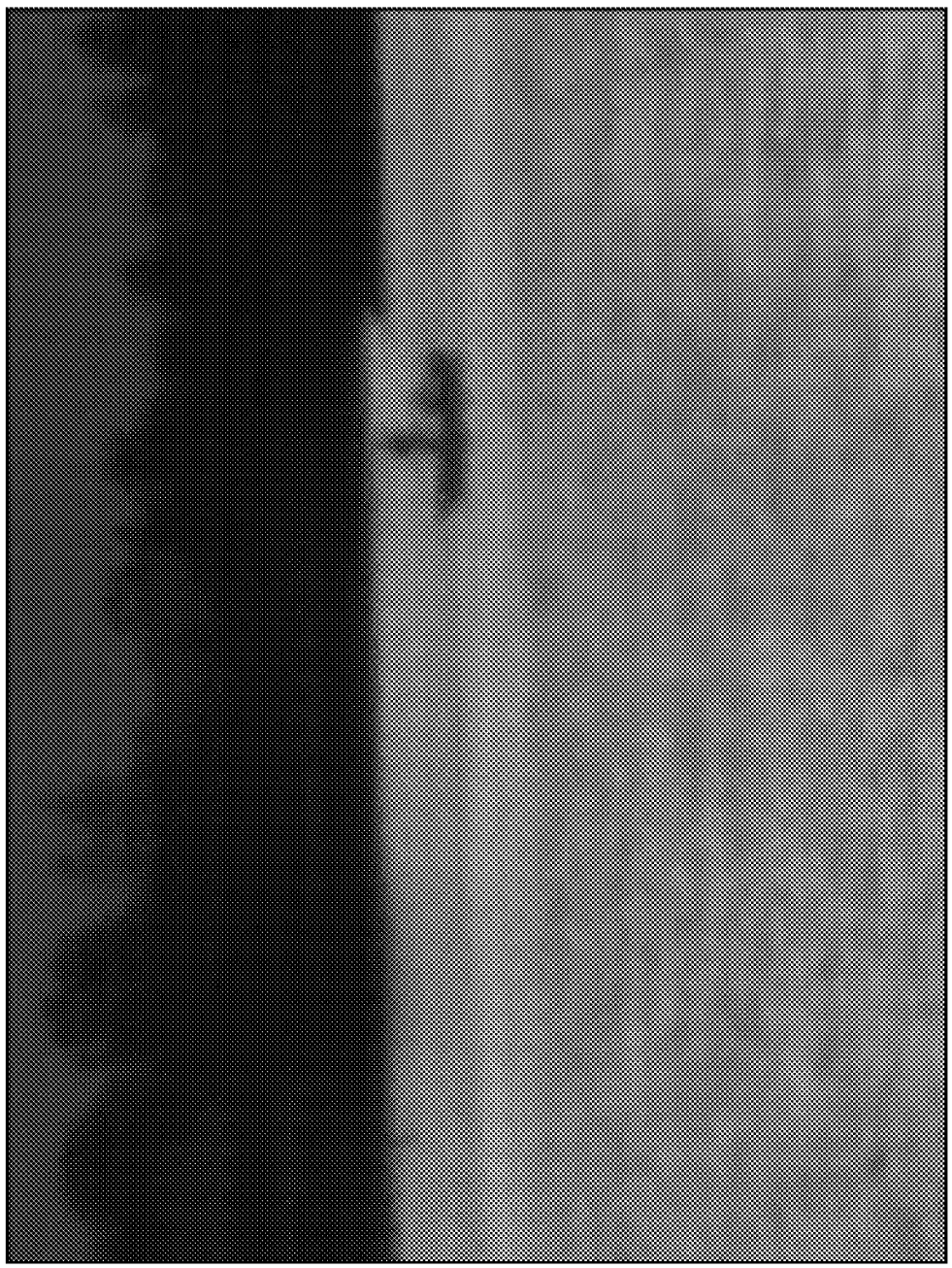
Figure 21:

FIG. 19 shows another example result, from a different input radiance image, according to conventional rendering. FIG. 20 is rendered from the same data as FIG. 19 using an embodiment of the impressionist technique described herein, with the value of α=16. FIG. 21 is rendered from the same data as FIG. 19 using an embodiment of the impressionist technique described herein, with the value of α=160.

Embodiments may provide a user interface that includes one or more user interface elements whereby a user may set or modify the values of parameters (including, but not limited to, the value of α and the depth of focus) used in the impressionist rendering technique, as described above.

Figure 22:
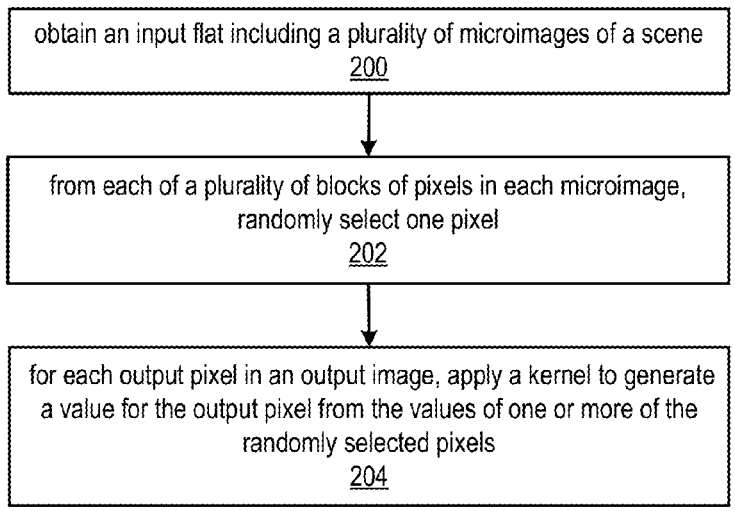
FIG. 22 is a flowchart of a method for rendering an image from an input radiance image using an impressionist rendering technique, according to at least some embodiments.

FIG. 22 is a flowchart of a method for rendering an image from an input radiance image, according to at least some embodiments. As indicated at 200, an input flat including a plurality of microimages of a scene may be obtained. As indicated at 202, from each of a plurality of blocks (e.g., 3×3 blocks) of pixels in each microimage, one pixel is randomly selected using a randomizing technique. An example of randomly sampling pixels is shown in FIG. 6. As indicated at 204 of FIG. 22, for each output pixel in an output image to be generated, a thin sampling kernel may be applied to generate a value for the output pixel; a thin sampling kernel is used so that only one or a few pixels are sampled for each output pixel. The values are generated by applying the sampling kernel to appropriate ones of the collection of pixels that were randomly selected from multiple microimages at element 202. In some embodiments, a Gaussian kernel defined as:

$$\text{Exp}(-\alpha r^2)$$

may be used, where r is the distance to the corresponding pixel center in units, and where distance between neighboring pixels is 1. In other embodiments, other sampling kernels may be used. An example rendering technique that may be employed at 204 is shown in FIG. 7.

In some cases, interpolation or some other technique may be applied to the output image to fill in gaps, if any, due to missing pixels. In some embodiments, the value of α may be adjusted, for example via a user interface. In some embodiments, the size of the block used to randomly selected pixels may be adjusted, for example via a user interface. In addition, the user interface may allow the user to vary the depth of focus, or other parameters, used in rendering the output image.

In at least some embodiments, a user interface may be provided via which a user may generate and view an output image from an input flat, change one or more parameters via the user interface, for example by adjusting a slider bar or other user interface element, and view a new version of the output image. In some embodiments, the rendering may be performed in real-time or near-real-time so that the user can interactively view the results of changes applied via the user interface.

Figure 23:
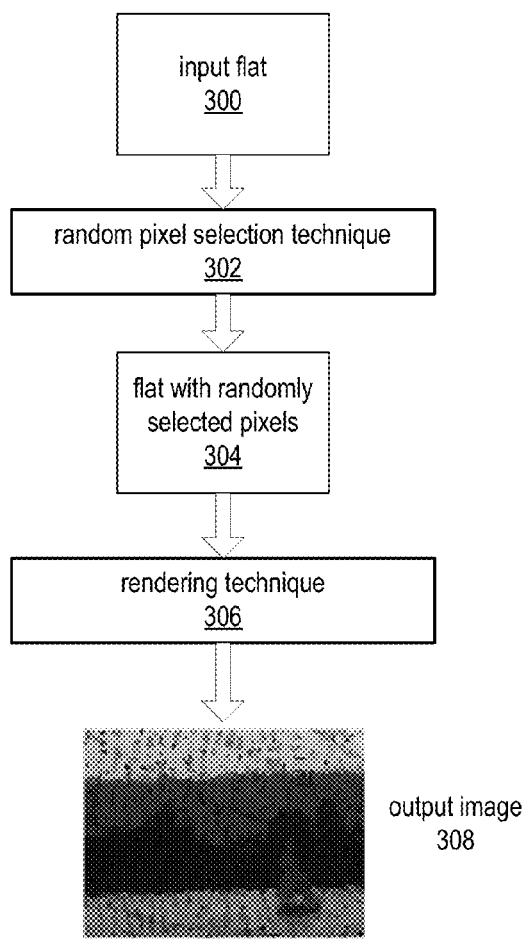
FIG. 23 illustrates data flow and processing in an impressionist rendering technique, according to at least some embodiments.

FIG. 23 illustrates data flow and processing in an impressionist rendering technique, according to at least some embodiments. A random pixel selection technique 302 may be applied to an input flat 300 to produce a flat with randomly selected pixels 304. An example of randomly sampling pixels is shown in FIG. 6. In some embodiments, in the random pixel selection technique 302, each microimage in the input flat 300 may be subdivided into a plurality of m×n blocks, for example 3×3 blocks. The blocks may be square, so m may be, but is not necessarily, equal to n. Note that, in various embodiments, other sizes blocks may be used, for example 2×2, 4×4, 5×5, and so on. While square blocks are given as examples, other shapes, for example rectangular shapes, may be used. The random pixel selection technique 302 may, for each m×n block of pixels in each microimage, use a random number generator to generate a random number between 1 and N (or 0 and N−1), where N=m×n, and is the number of pixels in a block (e.g., 9, in a 3×3 block). This random number may specify the selected pixel in the block. In some embodiments, the random pixel selection technique 302 may then remove all other, non-selected pixels in the block. When done, the flat with randomly selected pixels 304 in each microimage will include only one pixel for each block. A rendering technique 306 may then be applied to the flat with randomly selected pixels 304 to generate an output image 308. An example rendering technique that may be employed is shown in FIG. 7.

In at least some embodiments, a user interface may be provided via which a user may generate and view an output image 308 from input flat 300, change one or more parameters via the user interface, for example by adjusting a slider bar or other user interface element, and view a new version of the output image 308. In some embodiments, the rendering may be performed in real-time or near-real-time so that the user can interactively view the results of changes applied via the user interface. In some embodiments, when the user modifies a parameter, the method may re-apply the rendering technique 306 to the originally generated flat with randomly selected pixels 304 without performing random pixel selection 302. Alternatively, random pixel selection 302 may be performed to generate a new flat with randomly selected pixels 304 before applying the rendering technique 306.

Example Implementations of Rendering Methods

Figure 25:
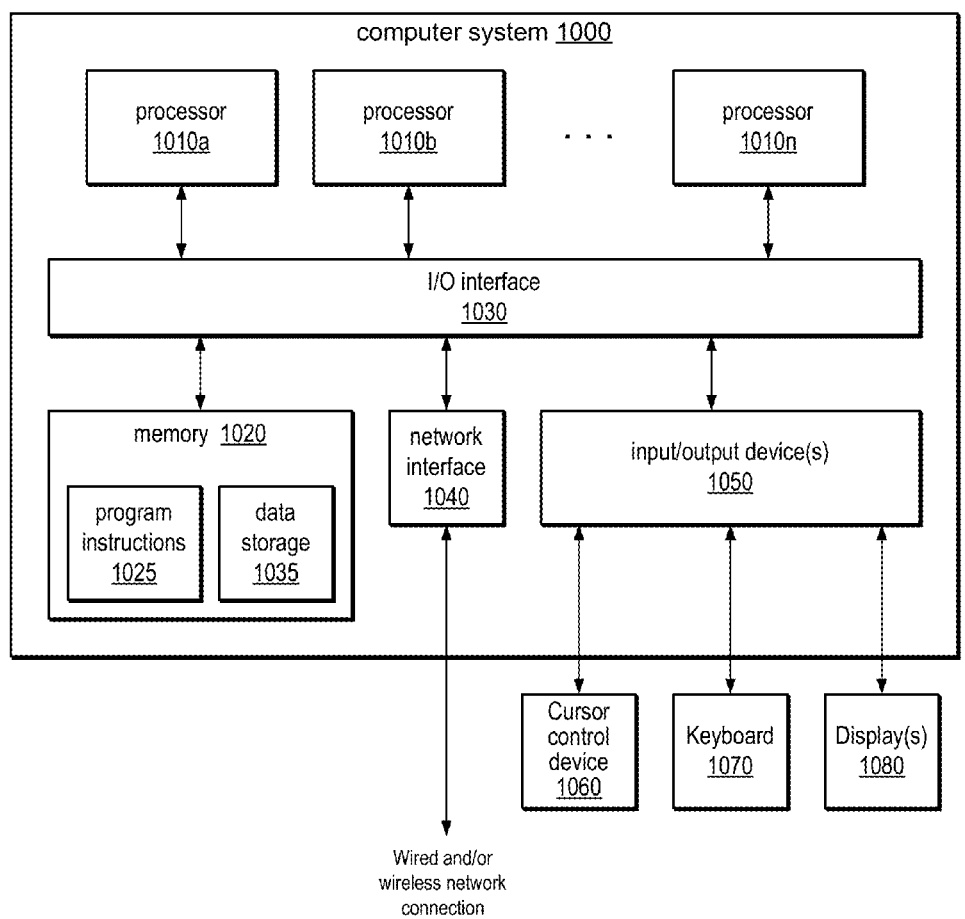
FIG. 25 illustrates an example computer system that may be used in embodiments.

Embodiments of the impressionist rendering technique may be performed by a rendering module implemented by program instructions stored in a computer-readable storage medium and executable by one or more processors (e.g., one or more CPUs or GPUs) of a computer system or other device. An example computer system on which a rendering module may be implemented is illustrated in FIG. 25. Embodiments of the impressionist rendering technique and/or rendering module may be implemented in any image processing application, or more generally in any application in which focused plenoptic camera data may be processed. Example applications in which embodiments of the impressionist rendering technique and/or the rendering module may be implemented may include, but are not limited to, Adobe® Photoshop®. "Adobe" and "Photoshop" are either registered trademarks or trademarks of Adobe Systems Incorporated in the United States and/or other countries. In addition to computer system implementations, embodiments of the impressionist rendering technique and/or rendering module may be implemented in other devices, for example in focused plenoptic cameras, as a software module, hardware module, or a combination thereof.

Figure 24:
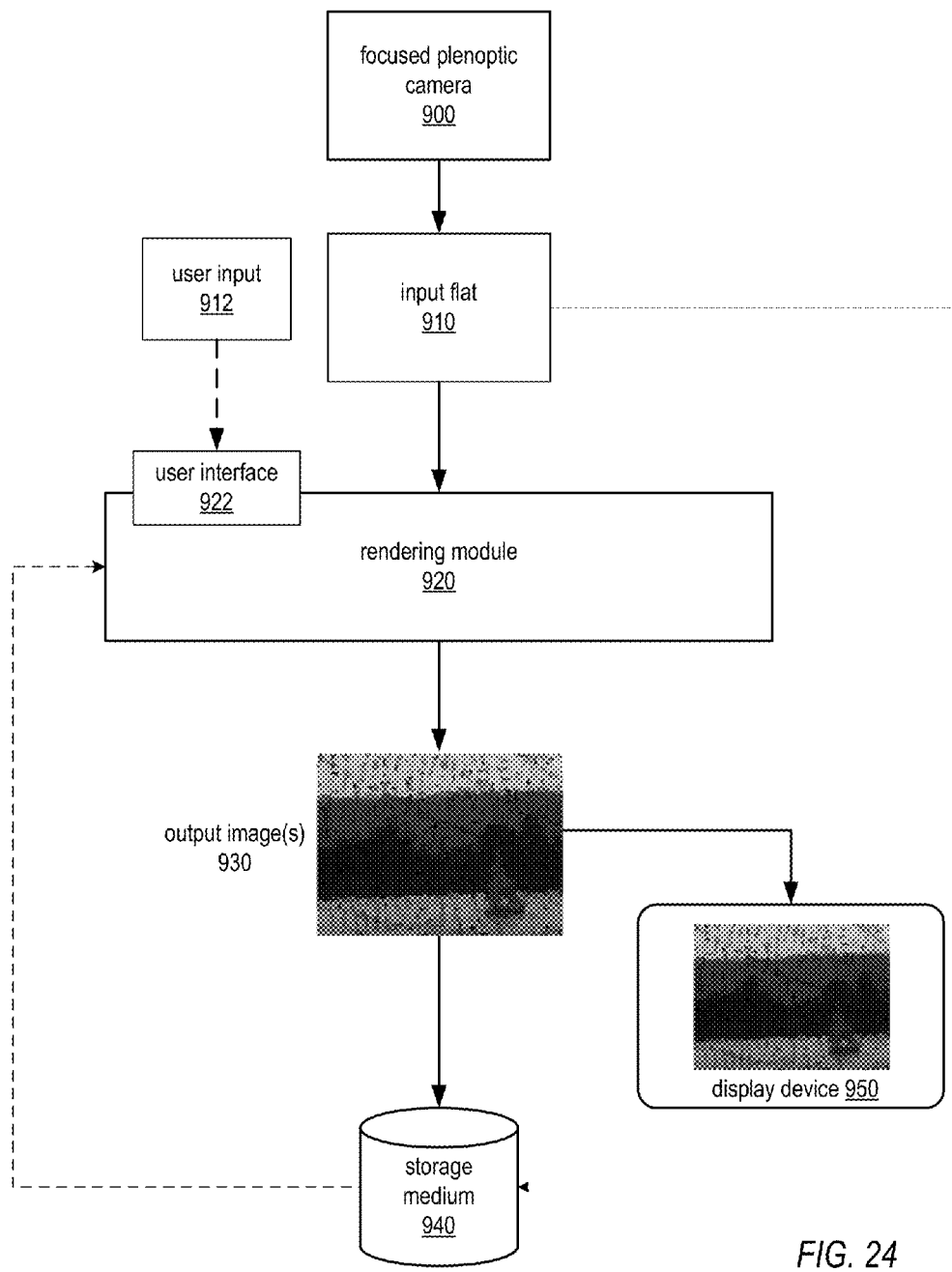
FIG. 24 illustrates a rendering module rendering an image from a flat captured using focused plenoptic camera technology, according to some embodiments.

FIG. 24 illustrates a rendering module rendering images from a flat captured, for example, by various embodiments of a focused plenoptic camera. Rendering module 920 may, for example, implement a method for rendering impressionistic-style images from flats captured using focused plenoptic cameras, as described herein, and may also implement other rendering techniques for focused plenoptic camera data. FIG. 25 illustrates an example computer system on which embodiments of rendering module 920 may be implemented. In some embodiments of a focused plenoptic camera, rendering module 920 may be implemented in the camera, e.g. in captured data processing module. Referring to FIG. 23, rendering module 920 receives an input flat 910 captured by a focused plenoptic camera, such as one of the embodiments of focused plenoptic cameras described herein. Rendering module 920 then processes the input image 910 according to an appropriate rendering method or methods as described herein. Rendering module 920 generates as output one or more images 930. Output image 930 may, for example, be stored to a storage medium 940, such as system memory, a disk drive, DVD, CD, etc. The dashed line from input image 910 to storage medium 940 indicates that the original (input) flat 910 may also be stored. The dashed line from storage medium 940 to rendering module 920 indicates that stored images may be retrieved and further processed by rendering module 920. Output image 930 may instead, or also, be displayed on a display device 950. Output image 930 may instead, or also, be passed to one or more other modules for additional processing.

In some embodiments, rendering module 920 may provide a user interface 922 via which a user may interact with the module 920, for example to specify or otherwise manage input flats 910 and output images 930 as described herein. The user interface 922 may also provide one or more user interface elements whereby the user may select or change parameters of the rendering method, such as one or more parameters for rendering an impressionistic-style image as described herein.

In at least some embodiments, the user may use the rendering module 920 to generate and view an output image 930 from input flat 910, change one or more parameters via the user interface 922, for example by adjusting a slider bar or other user interface element, and view a new version of the output image 930. In some embodiments, the rendering may be performed in real-time or near-real-time so that the user can interactively view the results of changes applied via the user interface 922.

Example System

Embodiments of a rendering module and/or one or more of the various rendering methods as described herein may be executed on one or more computer systems, which may interact with various other devices. One such computer system is illustrated by FIG. 25. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. In some embodiments, computer system 1000 may be a digital camera.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the various rendering methods disclosed herein may be implemented at least in part by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a rendering module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 25, memory 1020 may include program instructions 1025, configured to implement embodiments of a rendering module as described herein, and data storage 1035, comprising various data accessible by program instructions 1025. In one embodiment, program instructions 1025 may include software elements of embodiments of a rendering module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a rendering module as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:
1. A method, comprising:
 obtaining an input image comprising a plurality of separate microimages of an image of a scene, each of the microimages having a plurality of blocks of pixels;
 for each of the plurality of blocks of pixels, applying a random selection technique to randomly select one pixel from the block; and
 applying a rendering technique that uses the randomly selected pixels to render an output image of the scene from the plurality of separate microimages, the applying including, for each point on an image plane of the output image:

determining a line of projection through the microimages in optical phase space according to a current point on the image plane and an angle of projection determined from a current depth of focus; and for each microimage intersected by the line of projection, applying a sampling kernel centered at an intersection point of the line of projection with the microimage to sample values from pixels of the microimage covered by the sampling kernel, the values only being sampled from the randomly selected pixels in the microimage by the sampling kernel, and for a given point on the image plane of the output image, pixel values from at least one of the microimages intersected by the respective line of projection not being sampled when the sampling kernel does not cover at least one of the randomly selected pixels in said at least one of the microimages.

2. The method as recited in claim 1, wherein said applying a rendering technique that uses the randomly selected pixels to render an output image of the scene from the plurality of separate microimages further comprises, for each of the points on the image plane of the output image:

generating a value for a pixel at the current point in the output image from the values sampled from one or more of the randomly selected pixels by the sampling kernel.

3. The method as recited in claim 2, wherein, in said generating a value for a pixel at the current point in the output image from the values sampled from one or more of the randomly selected pixels by the sampling kernel, the values of the one or more randomly selected pixels sampled by the sampling kernel are weighted according to distance of the pixels from the intersection point on the respective microimage.

4. The method as recited in claim 1, wherein the sampling kernel is a thin Gaussian kernel.

5. The method as recited in claim 1, wherein, for the given point on the image plane of the output image, the sampling kernel samples randomly selected pixels from at most two of the microimages intersected by the respective line of projection.

6. The method as recited in claim 1, wherein the blocks are m×n blocks, where m and n are integers each greater than or equal to 2.

7. The method as recited in claim 6, where m and n are each equal to 3.

8. A system, comprising
at least one processor; and
a memory comprising program instructions, wherein the program instructions are executable by the at least one processor to:
obtain an input image comprising a plurality of separate microimages of an image of a scene;
subdivide each of the plurality of separate microimages into a plurality of blocks of pixels;
for each of the plurality of blocks of pixels in each microimage, apply a random selection technique to randomly select one pixel in the block; and
apply a rendering technique that uses the randomly selected pixels to render an output image of the scene from the plurality of separate microimages, the rendering technique is applied such that, for each point on an image plane of the output image:
a line of projection through the microimages in optical phase space is determined according to a current point on the image plane and an angle of projection determined from a current depth of focus; and for each microimage intersected by the line of projection, a sampling kernel centered at an intersection point of the line of projection with the microimage is applied to sample values from pixels of the microimage covered by the sampling kernel, the values are only sampled from the randomly selected pixels in the microimage by the sampling kernel, and for a given point on the image plane of the output image, pixel values from at least one of the microimages intersected by the respective line of projection are not sampled when the sampling kernel does not cover at least one of the randomly selected pixels in said at least one of the microimages.

9. The system as recited in claim 8, wherein the rendering technique is further applied such that, for each of the points on the image plane of the output image:

a value is generated for a pixel at the current point in the output image from the values sampled from one or more of the randomly selected pixels by the sampling kernel.

10. The system as recited in claim 9, wherein the value is generated for the pixel at the current point in the output image from the values sampled from one or more of the randomly selected pixels by the sampling kernel by weighting the values of the one or more randomly selected pixels sampled by the sampling kernel according to distance of the pixels from the intersection point on the respective microimage.

11. The system as recited in claim 8, wherein the sampling kernel is a thin Gaussian kernel.

12. The system as recited in claim 8, wherein, for the given point on the image plane of the output image, the sampling kernel samples randomly selected pixels from at most two of the microimages intersected by the respective line of projection.

13. A computer-readable storage device storing program instructions that are executable by a computing device to implement a method comprising:

obtaining an input image comprising a plurality of separate microimages of an image of a scene, each of the microimages having a plurality of blocks of pixels;

for each of the plurality of blocks of pixels, applying a random selection technique to randomly select one pixel from the block; and applying a rendering technique that uses the randomly selected pixels to render an output image of the scene from the plurality of separate microimages, the applying including, for each point on an image plane of the output image:

determining a line of projection through the microimages in optical phase space according to a current point on the image plane and an angle of projection determined from a current depth of focus; and for each microimage intersected by the line of projection, applying a sampling kernel centered at an intersection point of the line of projection with the microimage to sample values from pixels of the microimage covered by the sampling kernel, the values only being sampled from the randomly selected pixels in the microimage by the sampling kernel, and for a given point on the image plane of the output image, pixel values from at least one of the microimages intersected by the respective line of projection not being sampled when the sampling kernel does not cover at least one of the randomly selected pixels in said at least one of the microimages.

14. The computer-readable storage device as recited in claim 13, wherein, said applying a rendering technique that uses the randomly selected pixels to render an output image of the scene from the plurality of separate microimages further comprises, for each of the points on the image plane of the output image:

generating a value for a pixel at the current point in the output image from the values sampled from one or more of the randomly selected pixels by the sampling kernel.

15. The computer-readable storage device as recited in claim 14, wherein, said generating a value for a pixel at the current point in the output image from the values sampled from one or more of the randomly selected pixels by the sampling kernel includes weighting the values of the one or more randomly selected pixels sampled by the sampling kernel according to distance of the pixels from the intersection point on the respective microimage.

16. The computer-readable storage device as recited in claim 13, wherein the sampling kernel is a thin Gaussian kernel.

17. The computer-readable storage device as recited in claim 13, wherein, for the given point on the image plane of the output image, the sampling kernel samples randomly selected pixels from at most two of the microimages intersected by the respective line of projection.

\* \* \* \* \*